United States Patent
Wang et al.

(10) Patent No.: US 12,256,358 B2
(45) Date of Patent: *Mar. 18, 2025

(54) METHODS, APPARATUS AND SYSTEMS FOR SUPPORTING MOBILE INITIATED CONNECTION ONLY (MICO) WIRELESS TRANSMIT/RECEIVE UNITS (WTRUs)

(71) Applicant: InterDigital Patent Holdings, Inc., Wilmington, DE (US)

(72) Inventors: Guanzhou Wang, Brossard (CA); Saad Ahmad, Montreal (CA); Behrouz Aghili, Commack, NY (US); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,452

(22) Filed: Sep. 28, 2023

(65) Prior Publication Data
US 2024/0023048 A1 Jan. 18, 2024

Related U.S. Application Data

(63) Continuation of application No. 17/340,464, filed on Jun. 7, 2021, now Pat. No. 11,812,401, which is a
(Continued)

(51) Int. Cl.
*H04W 4/00* (2018.01)
*H04W 8/04* (2009.01)
(Continued)

(52) U.S. Cl.
CPC .............. *H04W 60/04* (2013.01); *H04W 8/04* (2013.01); *H04W 52/0258* (2013.01); *H04W 64/00* (2013.01); *H04W 4/70* (2018.02)

(58) Field of Classification Search
CPC ... H04W 60/04; H04W 8/04; H04W 52/0258; H04W 64/00
(Continued)

(56) References Cited

U.S. PATENT DOCUMENTS

2004/0005800 A1   1/2004   Hou
2011/0143756 A1   6/2011   Gallagher et al.
(Continued)

FOREIGN PATENT DOCUMENTS

CN   102143475 A   8/2011
CN   102783049 A   11/2012
(Continued)

OTHER PUBLICATIONS

TS 23.501: MO only and registration area, 3GPP Tdoc S2-171506, 3GPP SA WG2 Meeting #119 Feb. 13-17, 2017, Dubrovnik, Croatia, 3 pages.
(Continued)

*Primary Examiner* — Temica M Beamer
(74) *Attorney, Agent, or Firm* — Jamie T. Nguyen

(57) ABSTRACT

Methods, apparatus and systems for managing a connection state of a Wireless Transmit/Receive Unit (WTRU) that is in Mobile Initiated Communication Only (MICO) mode are disclosed. One representative method may include the WTRU obtaining information indicating that the WTRU is to initiate registration prior to sending a Service Request (SR). The representative method may further include the WTRU sending a registration request in accordance with the obtained information and sending a SR after registering with a Network Entity.

20 Claims, 14 Drawing Sheets

Related U.S. Application Data continuation of application No. 16/610,370, filed as application No. PCT/US2018/029853 on Apr. 27, 2018, now Pat. No. 11,039,413.

(60) Provisional application No. 62/502,043, filed on May 5, 2017.

(51) Int. Cl.
    *H04W 52/02*    (2009.01)
    *H04W 60/04*    (2009.01)
    *H04W 64/00*    (2009.01)
    *H04W 4/70*     (2018.01)

(58) Field of Classification Search
    USPC ...................................................... 455/435.1
    See application file for complete search history.

(56) References Cited

U.S. PATENT DOCUMENTS

| | | |
|---|---|---|
| 2012/0322477 A1 | 12/2012 | Kang et al. |
| 2016/0100362 A1 | 4/2016 | Palanisamy et al. |
| 2016/0277921 A1 | 9/2016 | Gauvreau et al. |
| 2019/0037516 A1 | 1/2019 | Kim et al. |
| 2020/0008184 A1 | 1/2020 | Lee et al. |
| 2020/0275302 A1 | 8/2020 | Youn et al. |

FOREIGN PATENT DOCUMENTS

| | | |
|---|---|---|
| JP | 2016163165 A | 9/2016 |
| WO | WO 03074659 A2 | 9/2003 |

OTHER PUBLICATIONS

3rd Generation Partnership Project (3GPP), TS 23.501 V0.4.0, "Technical Specification Group Services and System Aspects, System Architecture for the 5G System, Stage 2 (Release 15)", Apr. 2017, pp. 1-124.
Zhang, Xianxiong, "Design and Implementation of North Interface of Network Management of Access Equipment", China Master's Theses Full-text Database (CMFD), Apr. 30, 2012, 56 pages.
Samsung, TS 23.501: Clarification on MICO for all PLMN indication, 3GPP Tdoc S2-171880; 3GPPP SA WG2 Meeting #120, Busan, S. Korea, Mar. 27-31, 2017, 2 pages.
3rd Generation Partnership Project; Technical Specification Group Services and System Aspects; System Architecture for the 5G System; Stage 2 (Release 15), 3GPP TS 23.501 V0.4.0, Apr. 2017, 124 pages.
Chinese Publication No. 102143475A English Language Abstract.
Ericsson, 3GPP Tdoc S2-171689, "MICO mode updates", SA WG2 Meeting #120, Busan, Korea, Mar. 27-31, 2017, 5 pages.
Huawei et al, "TS 23.502: Update to the general registration procedure and the service request procedure for supporting MICO mode", 3GPP Tdoc S2-172009, 3GPP TSG SA WG2 Meeting #120, Busan, South Korea, Mar 27-31, 2017, 8 pages.
Qualcomm Incorporated, et al., "TS 23.501: Clarification on MICO mode", 3GPP Tdoc S2-172615 (was S2-171711), SA WG2 Meeting #S2-120, Mar. 27-31, 2017, Busan, South Korea, 4 pages.
Nokia et al., NAS/AS modeling for NR idle, 3GPP Tdoc R2-172765; 3GPP TSG-RAN WG2 Meeting #97bis, Spokane, USA, Apr. 3-7, 2017, 8 pages.
3rd Generation Partnership Project; Technical Specification Group Services and System Aspects; General Packet Radio Service (GPRS) enhancements for Evolved Universal Terrestrial Radio Access Network (E-UTRAN) access (Release 14), 3GPP TS 23.401 V14.2.0, Dec. 2016, 385 pages.
JP Publication No. 2016-163165, English Language Abstract.
3rd Generation Partnership Project; Technical Specification Group Services and System Aspects; Service requirements for Machine-Type Communications (MTC); Stage 1 (Release 12), 3GPP TS 22.368 V12.0.0, Sep. 2012, 25 pages.
3rd Generation Partnership Project; Technical Specification Group Services and System Aspects; Procedures for the 5G System; Stage 2 (Release 15), 3GPP TS 23.502 V0.3.0, Mar. 2017, 116 pages.
CATT,Pseudo-CR on reachability management for stage 3 5G system, 3GPP Tdco C1-171436; 3GPP TSG-CT WG1 Meeting #103, Spokane (WA), USA, Apr. 3-7, 2017, 2 pages.
"TS 23.501: MO only and registration area", 3GPPP Tdoc S2-171554, 3GPP SA WG2 Meeting #119 Feb. 13-17, 2017, Dubrovnik, Croatia, 4 pages.
LG Electronics et al., "Updates to 'Generic UE Configuration update procedure'", 3GPP Tdoc S2-174027, 3GPP SA WG2 Meeting #121, Hangzhou, P.R. China, May 15-19, 2017, 5 pages.
Interdigital, Inc., "P-CR for TS23.501: MICO UEs with "all-PLMN" registration area", 3GPP Tdoc S2-173548, 3GPP SA WG2 Meeting #S2-121, Hangzhou, P. R. China, May 15-19, 2017, 2 pages.
Ericsson, 3GPP Tdoc S2-171881, "TS 23.501: Keep MICO mode UE in connected", SA WG2 Meeting #120, Busan, S. Korea, Mar. 27-31, 2017, 3 pages.

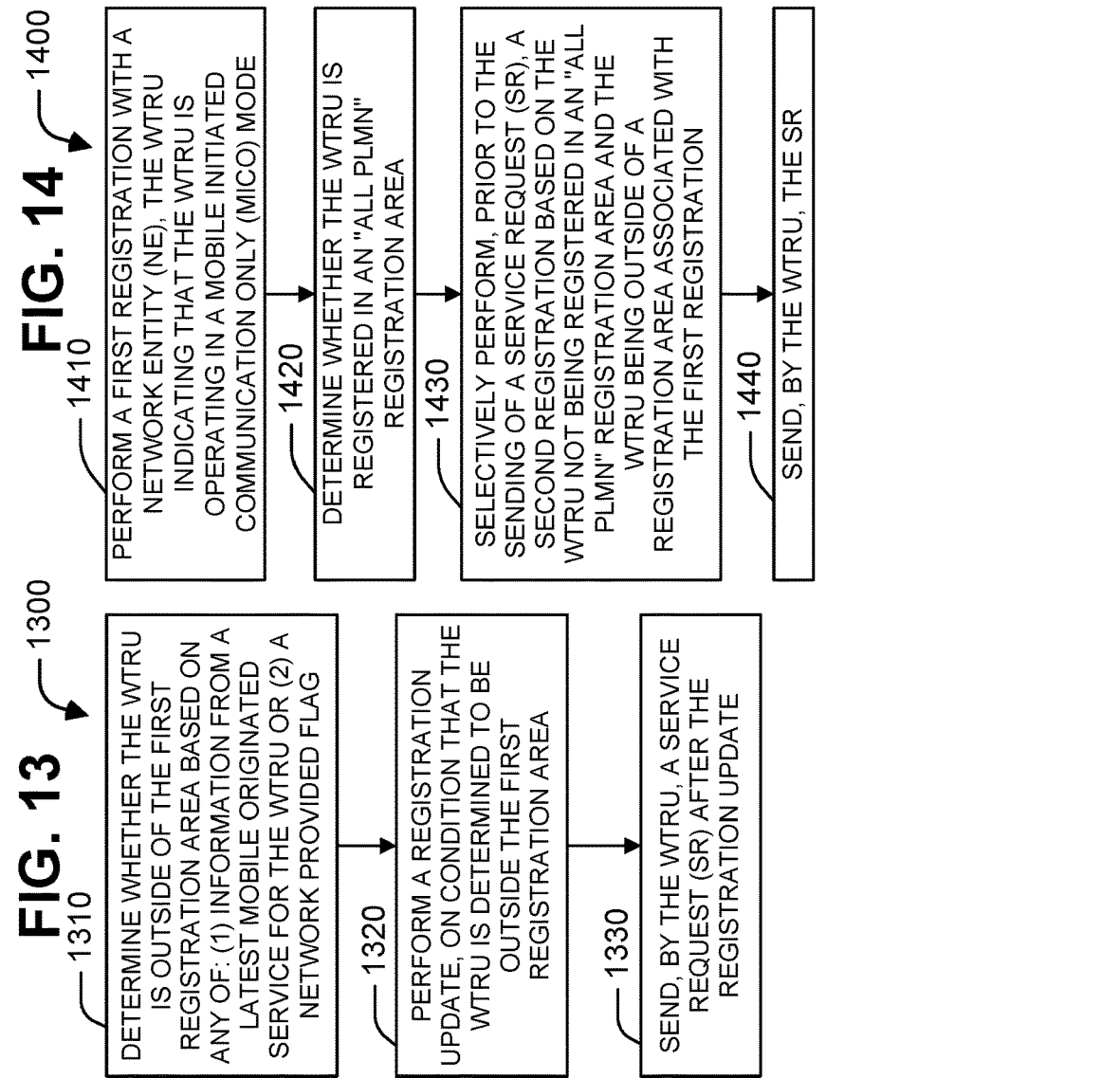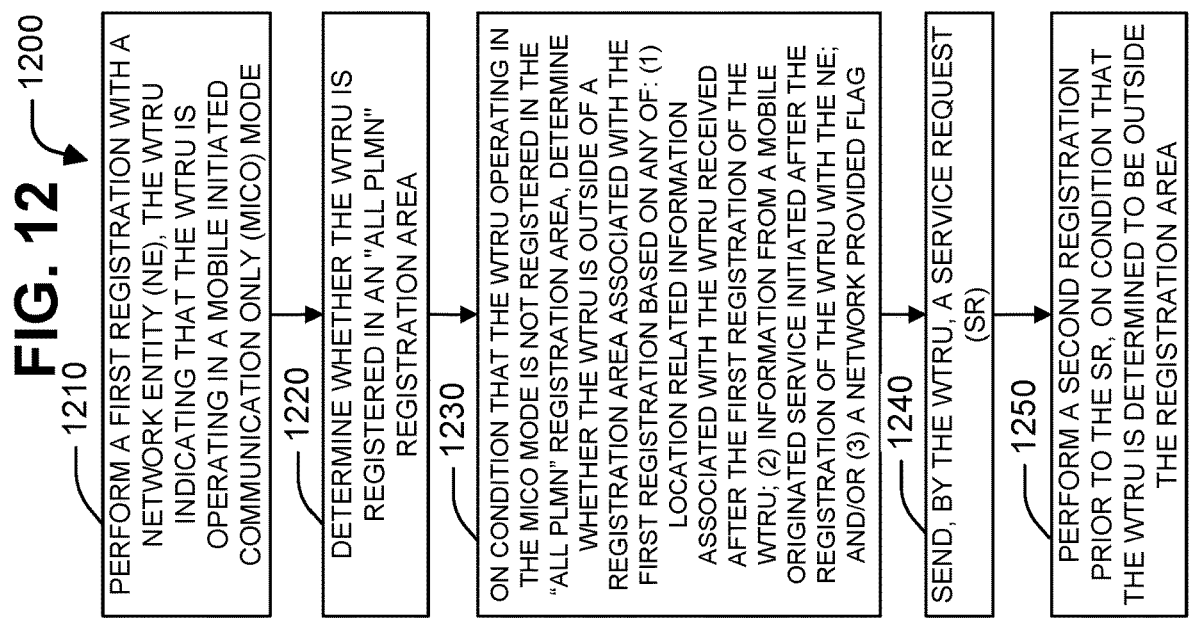

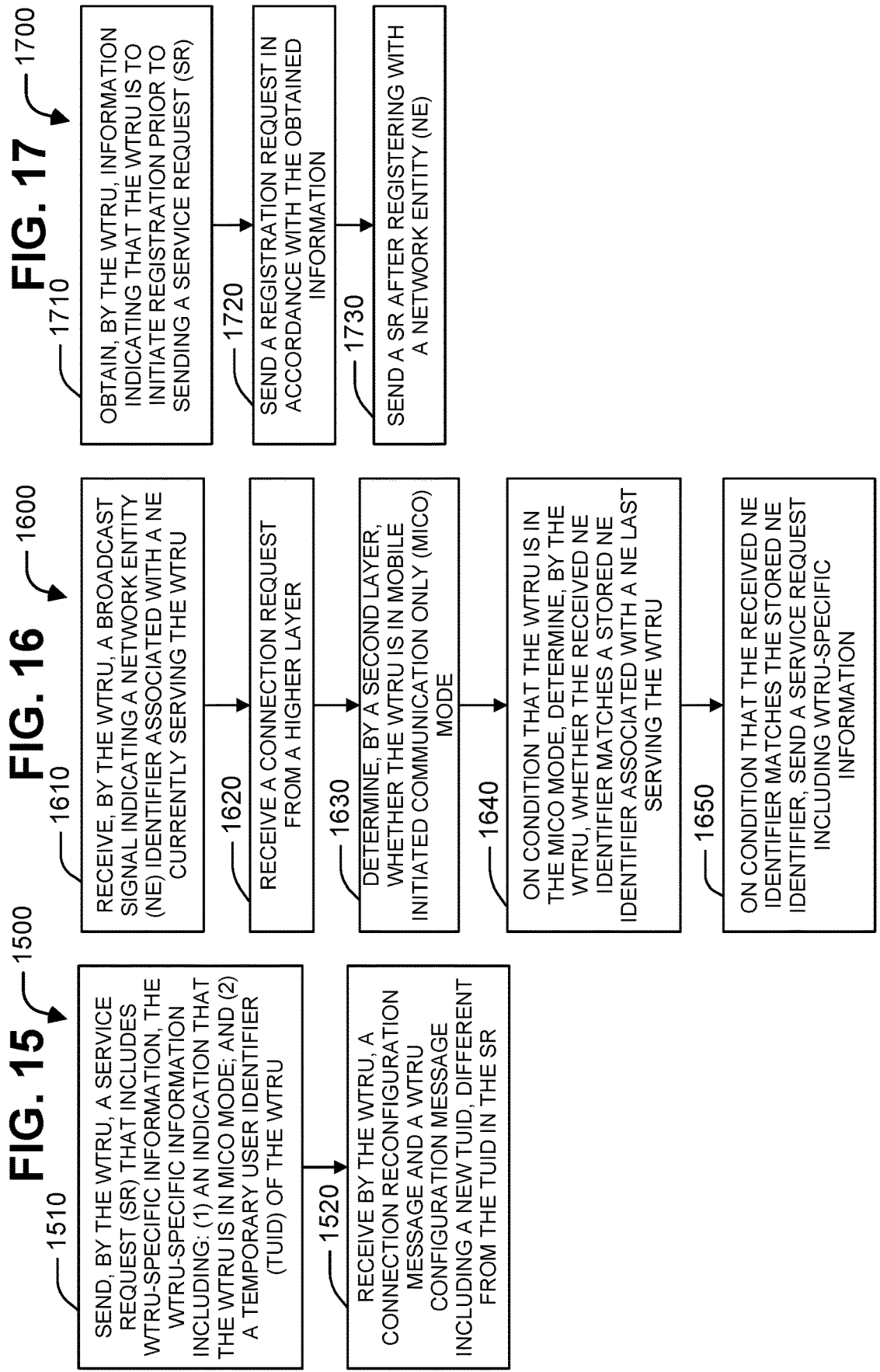

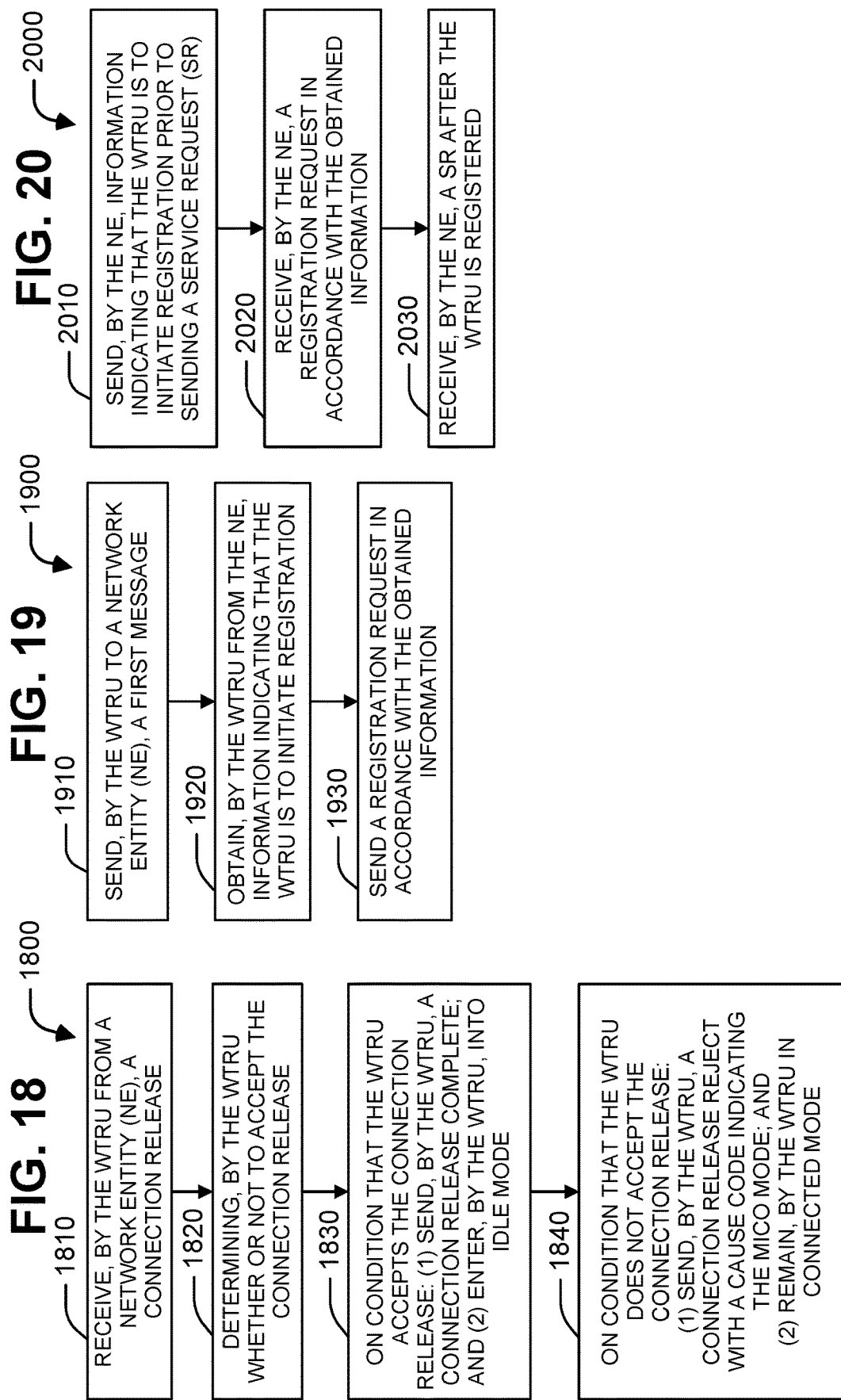

2110 — DETERMINE, BY THE NE, WHETHER THE WTRU IS IN A MOBILE INITIATED COMMUNICATION ONLY (MICO) MODE

↓

2120 — ON CONDITION THAT THE WTRU IS IN THE MICO WTRU MODE, ANY OF: (1) SET AN INACTIVITY TIMER FOR A PERIOD WHICH IS LONGER THAN A PERIOD FOR A WTRU NOT IN MICO MODE; (2) PREVENT A CONNECTION RELEASE OF THE WTRU FOR INACTIVITY OF THE WTRU; OR (3) NEGOTIATING WITH THE WTRU SO THAT THE WTRU IS CONFIGURED TO AUTONOMOUSLY RELEASE THE CONNECTION WITH THE NE

2210 — RECEIVE, BY THE NE, A MESSAGE REQUESTING A CONNECTION OF A WIRELESS TRANSMIT/RECEIVE UNIT (WTRU) INCLUDING WTRU-SPECIFIC INFORMATION

↓

2220 — DETERMINE, BY THE NE FROM THE WTRU-SPECIFIC INFORMATION, ANOTHER NE THAT LAST SERVED THE WTRU

↓

2230 — SEND, BY THE NE TO THE OTHER NE, AN INFORMATION REQUEST FOR INFORMATION TO CONNECT THE WTRU WITH THE NE

2310 — RECEIVE, BY THE NE, A REGISTRATION REQUEST TO REGISTER A WIRELESS TRANSMIT/RECEIVE UNIT (WTRU) INCLUDING AN INDICATION THAT THE WTRU IS IN A MOBILE INITIATED COMMUNICATION ONLY (MICO) MODE

↓

2320 — RECEIVE, BY THE NE FROM THE WTRU AFTER REGISTRATION, A SERVICE REQUEST INCLUDING A PREFERENCE FOR WTRU-INITIATED CONNECTION RELEASE OF THE WTRU

↓

2330 — RECEIVE FROM ONE OF: THE WTRU OR ANOTHER NE, A REQUEST TO RELEASE THE WTRU

↓

2340 — RELEASE, BY THE NE, A CONNECTION TOWARD THE WTRU

METHODS, APPARATUS AND SYSTEMS FOR SUPPORTING MOBILE INITIATED CONNECTION ONLY (MICO) WIRELESS TRANSMIT/RECEIVE UNITS (WTRUs)

CROSS REFERENCE TO RELATED APPLICATIONS

This application is a Continuation of U.S. patent application Ser. No. 17/340,464 filed on Jun. 7, 2021 which is a Continuation of U.S. patent application Ser. No. 16/610,370 filed on Nov. 1, 2019 which is a U.S. National Stage Application under 35 U.S.C. 371 of International Patent Application No. PCT/US2018/029853 filed Apr. 27, 2018 which claims priority from U.S. Provisional Patent Application No. 62/502,043 filed on May 5, 2017, the contents of which are hereby incorporated herein by reference as if fully set forth.

FIELD

The disclosure relates to the field of wireless communications and, more particularly, to methods, apparatus and systems for supporting MICO WTRUs (e.g., in 5G).

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 12 is a flowchart illustrating a representative method of facilitating a SR;

FIG. 13 is a flowchart illustrating another representative method of facilitating a SR;

FIG. 14 is a flowchart illustrating a further representative method of facilitating a SR;

FIG. 15 is a flowchart illustrating an additional representative method of facilitating a SR;

FIG. 16 is a flowchart illustrating yet another representative method of facilitating a SR;

FIG. 17 is a flowchart illustrating yet a further representative method of facilitating a SR;

FIG. 18 is a flowchart illustrating yet an additional representative method of accepting or rejecting a connection release;

FIG. 19 is a flowchart illustrating a representative method to facilitate a registration;

FIG. 20 is a flowchart illustrating a representative method implemented by a NW to facilitate a SR;

FIG. 21 is a flowchart illustrating another representative method implemented by a NW when a WTRU is in MICO mode;

FIG. 22 is a flowchart illustrating a further representative method implemented by a NW to facilitate a connection request;

FIG. 23 is a flowchart illustrating an additional representative method implemented by a NW to facilitate a SR;

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1A:
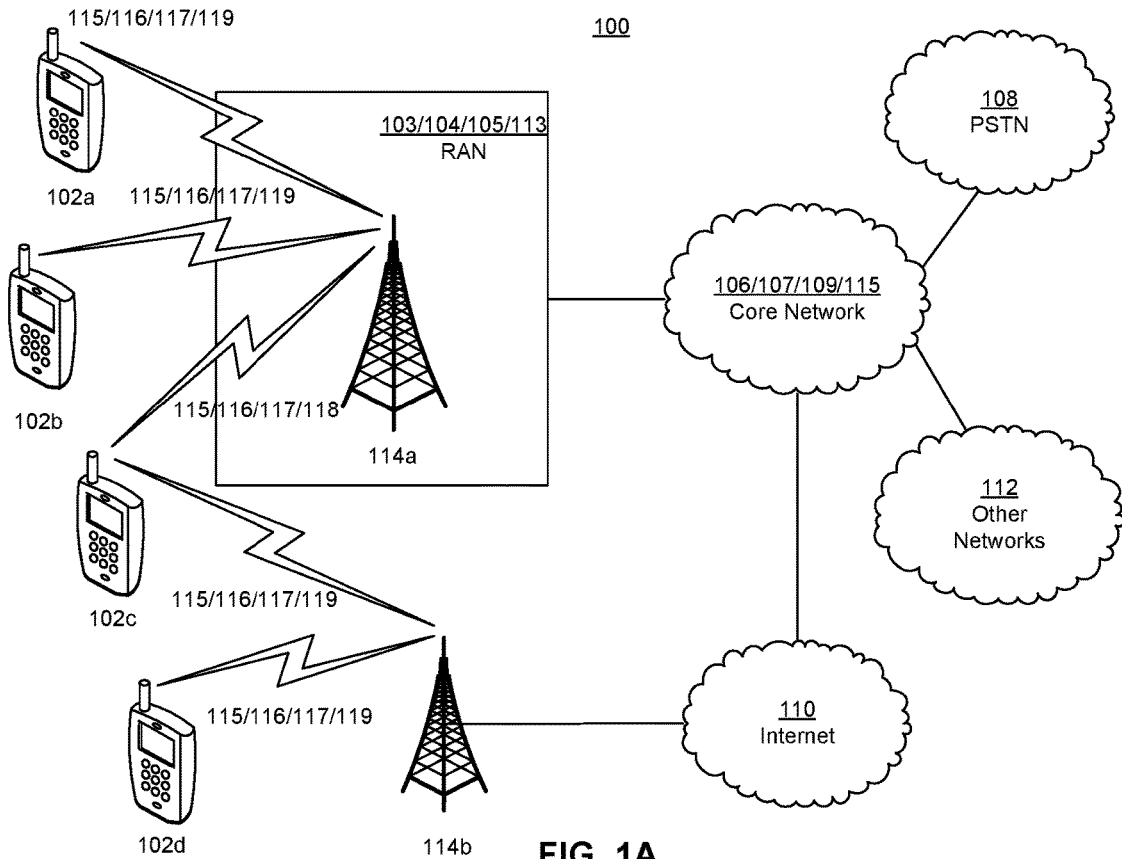
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC) and the like.

As shown in FIG. 1A, the communications system 100 may include wireless transmit/receive units (WTRUs) 102a, 102b, 102c, 102d, a radio access network (RAN) 103/104/105/113, a CN 106/107/109/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/107/109/115, the Internet 110, and/or the other networks 112. By way of example, the base stations 114a, 114b may be a base transceiver station (BTS), a Node-B, an eNode-B, a 5G access point (e.g., a gNB), a Home Node B, a Home eNode-B, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). The cell may further be divided into cell sectors. These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 115/116/117/119, which may be any suitable wireless communication link (e.g., radio frequency (RF), microwave, centimeter wave, micrometer wave, infrared (IR), ultraviolet (UV), visible light, etc.). The air interface 115/116/117/119 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105/113 and the WTRUs 102a, 102b, 102c may implement a radio technology such as Universal Mobile Telecommunications System (UMTS) Terrestrial Radio Access (UTRA), which may establish the air interface 115/116/117/119 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117/119 using Long Term Evolution (LTE) and/or LTE-Advanced (LTE-A), LTE-Advanced Pro (LTE-A Pro) and/or 5G New Radio (NR).

In an embodiment, the base station 114a and the WTRUs 102a, 102b, 102c may implement a radio technology such as NR Radio Access, which may establish the air interface 119 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/107/109/115.

The RAN 103/104/105/113 may be in communication with the CN 106/107/109/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. For example, the CN 106/107/109/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105/113 and/or the CN 106/107/109/115 may be in direct or indirect communication with other RANs that employ the same RAT as the RAN 103/104/105/113 or a different RAT. For example, in addition to being connected to the RAN 103/104/105/113, which may be utilizing an NR or E-UTRA radio technology, the CN 106/107/109/115 may also be in communication with another RAN (not shown) employing a GSM, UMTS, CDMA 2000, WiMAX, or WiFi radio technology.

The CN 106/107/109/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 103/104/105/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology. Some or all of the WTRUs 102a, 102b, 102c, 102d in the communication system 100 may communicate with other devices using, for example Bluetooth technology.

Figure 1C:
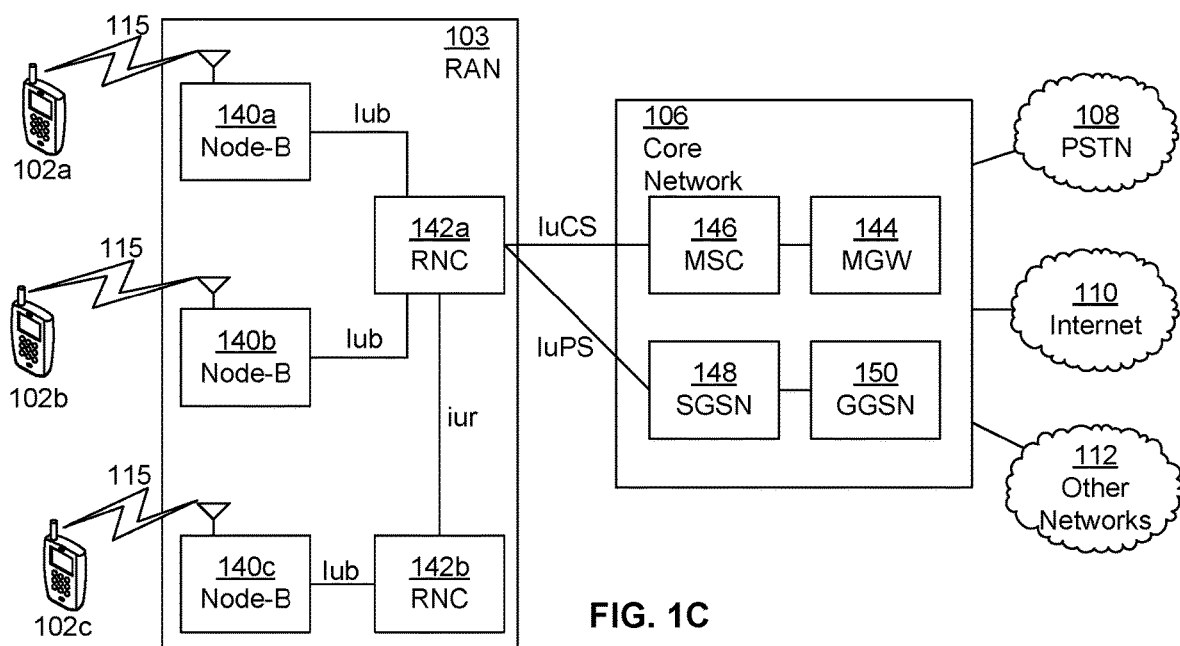
FIG. 1C is a system diagram illustrating an example radio access network (RAN) and an example core network (CN) that may be used within the communications system illustrated in FIG. 1A according to an embodiment.
Figure 1B:
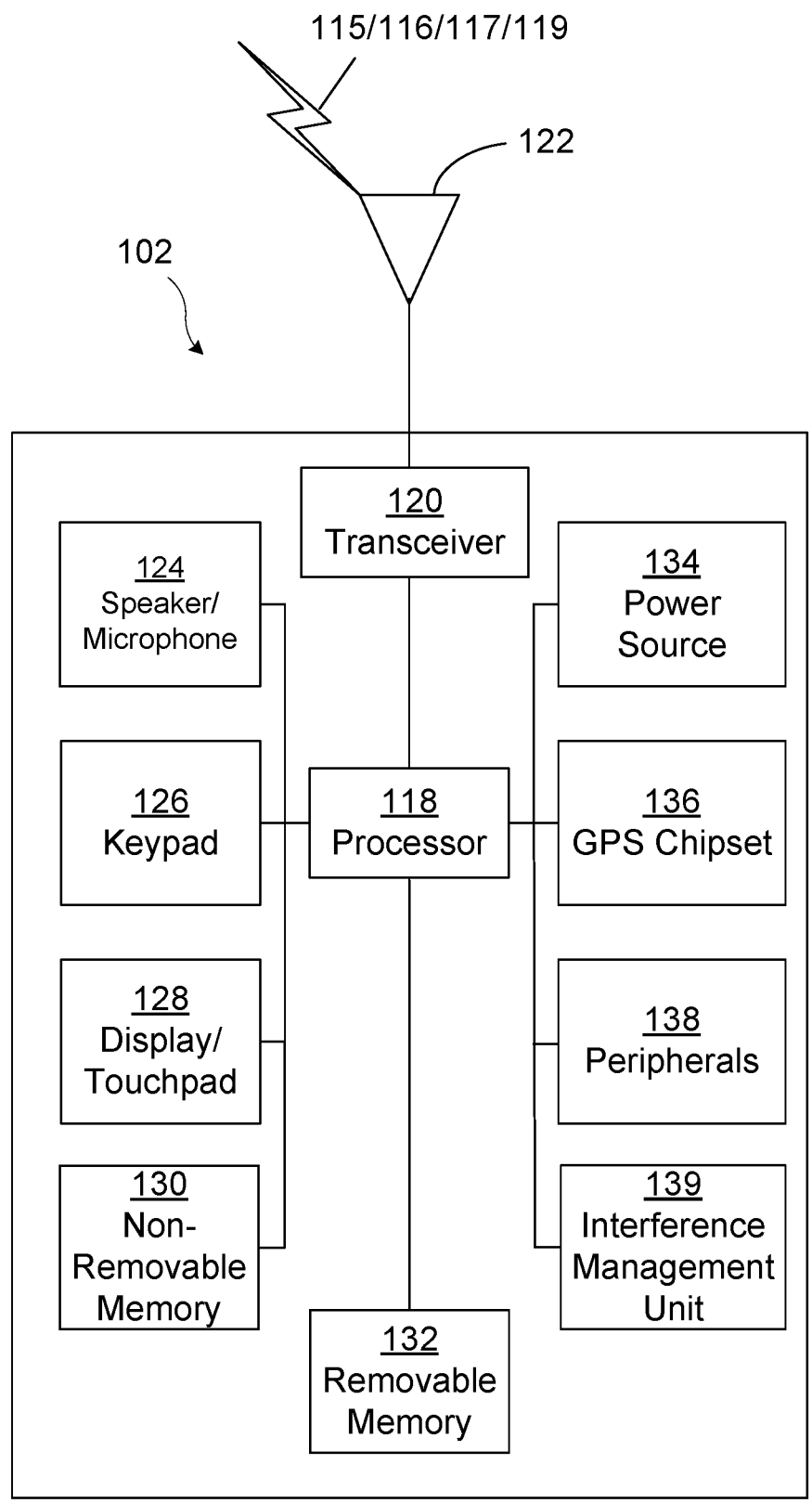
FIG. 1B is a system diagram illustrating an example wireless transmit/receive unit (WTRU) that may be used within the communications system illustrated herein in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, an interference management unit 139 and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to and/or receive signals from, a base station (e.g., the base station 114a) over the air interface 115/116/117/119. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and/or receiving wireless signals over the air interface 115/116/117/119.

The transceiver 120 may be configured to modulate the signals that are to be transmitted by the transmit/receive element 122 and/or to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR, UTRA and/or IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and/or store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and/or store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may be coupled to the GPS chipset 136, which may be configured to provide location information (e.g., longitude and/or latitude) regarding the current location of the WTRU 102. In addition to, or in lieu of, the information from the GPS chipset 136, the WTRU 102 may receive location information over the air interface 115/116/117/119 from a base station (e.g., base stations 114a, 114b) and/or may determine its location based on the timing of the signals being received from two or more nearby base stations. It will be appreciated that the WTRU 102 may acquire location information by way of any suitable location-determination method while remaining consistent with an embodiment.

The processor 118 may be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor and the like.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g. for reception) may be, for example partially or fully, concurrent and/or simultaneous. The full duplex radio may include an interference management unit 139 to reduce and/or substantially eliminate self-interference via either hardware (e.g., a choke) or signal processing via a processor (e.g., a separate processor (not shown) or via processor 118). In an embodiment, the WTRU 102 may include a half-duplex radio for transmission and reception of some or all of the signals (e.g., associated with particular subframes for either the UL (e.g., for transmission) or the downlink (e.g., for reception)).

FIG. 1C is a system diagram illustrating the RAN 103 and the CN 106 according to another embodiment. As noted above, the RAN 103 may employ a UTRA radio technology to communicate with the WTRUs 102a, 102b, 102c over the air interface 115. The RAN 103 may also be in communication with the CN 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The CN 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the CN 106, it will be appreciated that any one of these elements may be owned and/or operated by an entity other than the CN operator.

The RNC 142a in the RAN 103 may be connected to the MSC 146 in the CN 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the CN 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the CN 106 may also be connected to the other networks 112, which may include other wired and/or wireless networks that are owned and/or operated by other service providers.

Figure 1D:
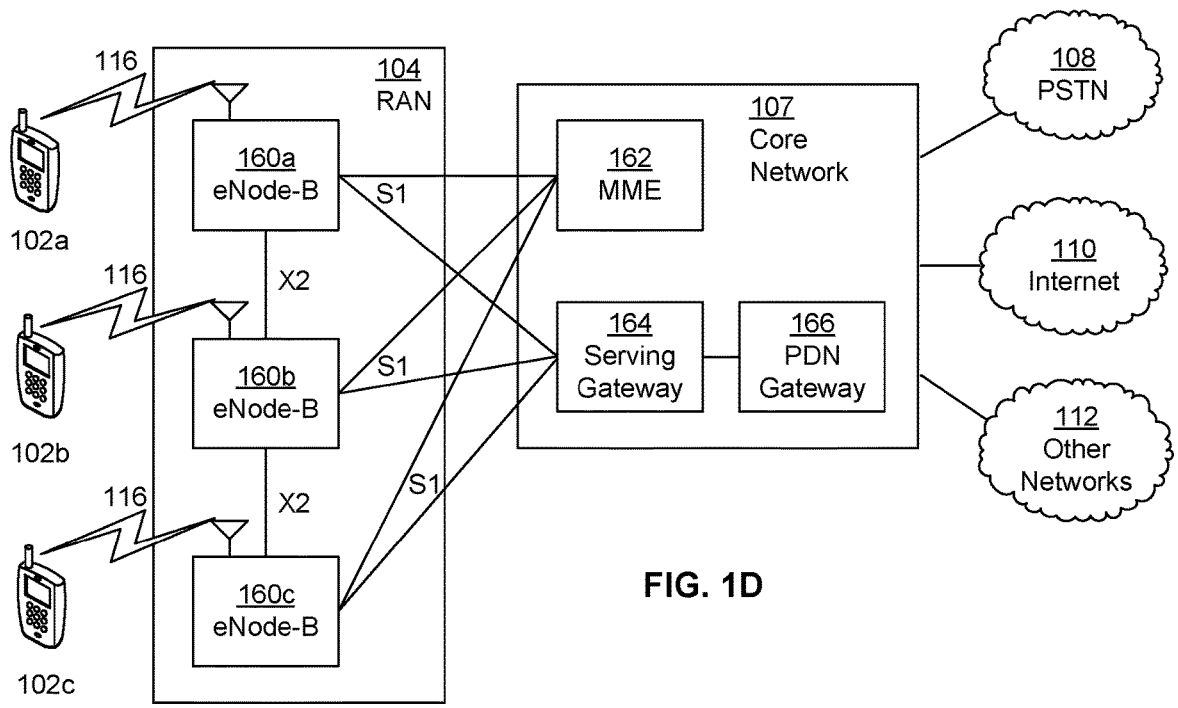
FIG. 1D is a system diagram illustrating a further example RAN and a further example CN that may be used within the communications system illustrated in FIG. 1A according to an embodiment.

FIG. 1D is a system diagram illustrating the RAN 104 and the CN 107 according to an embodiment. As noted above, the RAN 104 may employ an E-UTRA radio technology to communicate with the WTRUs 102a, 102b, 102c over the air interface 116. The RAN 104 may also be in communication with the CN 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1D, the eNode-Bs 160a, 160b, 160c may communicate with one another over an X2 interface. The eNode-B may include a full duplex radio similar to that of the WTRU 102 (e.g., with an interference management unit). The CN 107 shown in FIG. 1D may include a mobility management entity (MME) 162, a serving gateway (SGW) 164, and a packet data network (PDN) gateway (or PGW) 166. While each of the foregoing elements are depicted as part of the CN 107, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 107 may facilitate communications with other networks. For example, the CN 107 may provide the WTRUs 102a, 102b, 102c with access to circuit-switched networks, such as the PSTN 108, to facilitate communications between the WTRUs 102a, 102b, 102c and traditional land-line communications devices. For example, the CN 107 may include, or may communicate with, an IP gateway (e.g., an IP multimedia subsystem (IMS) server) that serves as an interface between the CN 107 and the PSTN 108. In addition, the CN 107 may provide the WTRUs 102a, 102b, 102c with access to the other networks 112, which may include other wired and/or wireless networks that are owned and/or operated by other service providers.

Figure 1E:
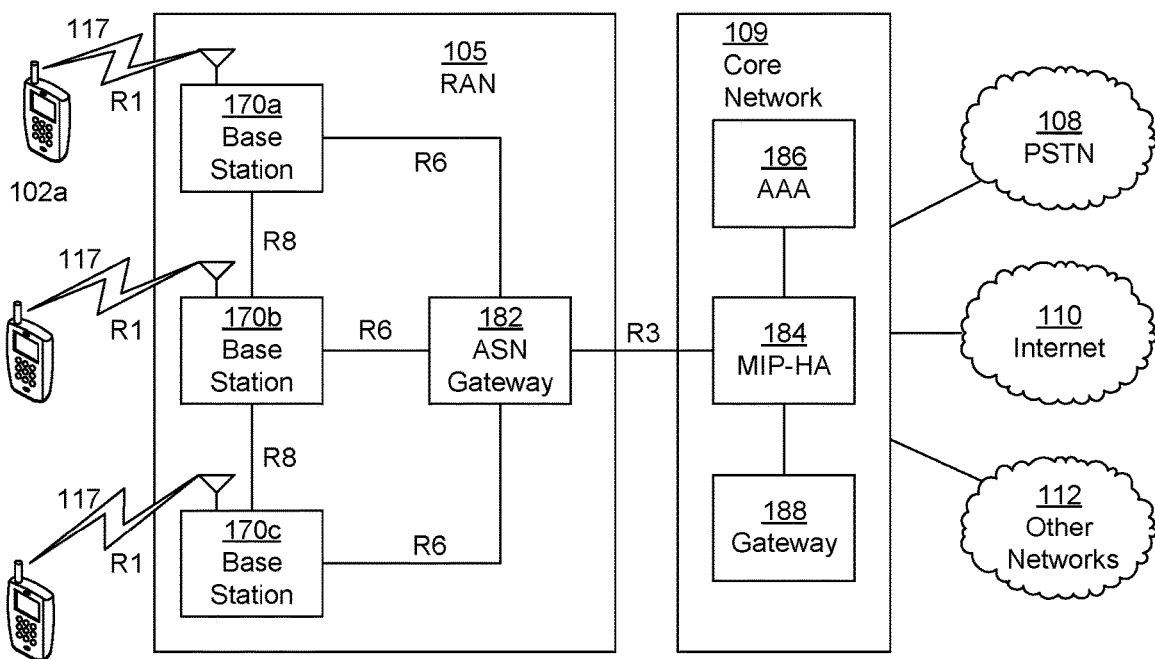
FIG. 1E is a system diagram illustrating another example radio access network and another example CN that may be used within the communications system illustrated in FIG. 1A.

FIG. 1E is a system diagram illustrating the RAN 105 and the CN 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the CN 109 may be defined as reference points.

As shown in FIG. 1E, the RAN 105 may include base stations 170a, 170b, 170c, and an ASN gateway 182, though it will be appreciated that the RAN 105 may include any number of base stations and ASN gateways while remaining consistent with an embodiment. The base stations 170a, 170b, 170c may each be associated with a particular cell (not shown) in the RAN 105 and may each include one or more transceivers for communicating with the WTRUs 102a, 102b, 102c over the air interface 117. In one embodiment, the base stations 170a, 170b, 170c may implement MIMO technology. The base station 170a, for example, may use multiple antennas to transmit wireless signals to, and/or receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the CN 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the CN 109. The logical interface between the WTRUs 102a, 102b, 102c and the CN 109 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the CN 109. The communication link between the RAN 105 and the CN 109 may be defined as an R3 reference point that includes protocols for facilitating data transfer and mobility management capabilities, for example. The CN 109 may include a mobile IP home agent (MIP-HA) 184, an authentication, authorization, accounting (AAA) server 186, and a gateway 188. While each of the foregoing elements are depicted as part of the CN 109, it will be appreciated that any of these elements may be owned and/or operated by an entity other than the CN operator.

The MIP-HA 184 may be responsible for IP address management, and may enable the WTRUs 102a, 102b, 102c to roam between different ASNs and/or different CNs. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 1E, it will be appreciated that the RAN 105 may be connected to other ASNs, other RANs (e.g., RANs 103 and/or 104) and/or the CN 109 may be connected to other CNs (e.g., CN 106 and/or 107). The communication link between the RAN 105 and the other ASNs may be defined as an R4 reference point, which may include protocols for coordinating the mobility of the WTRUs 102a, 102b, 102c between the RAN 105 and the other ASNs. The communication link between the CN 109 and the other CNs may be defined as an R5 reference, which may include protocols for facilitating interworking between home CNs and visited CNs.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. IF is a system diagram illustrating the RAN 113 and the CN 115 according to an embodiment. As noted above, the RAN 113 may employ an NR radio technology to communicate with the WTRUs 102a, 102b, 102c over the air interface 119. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 119. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Figure 1F:
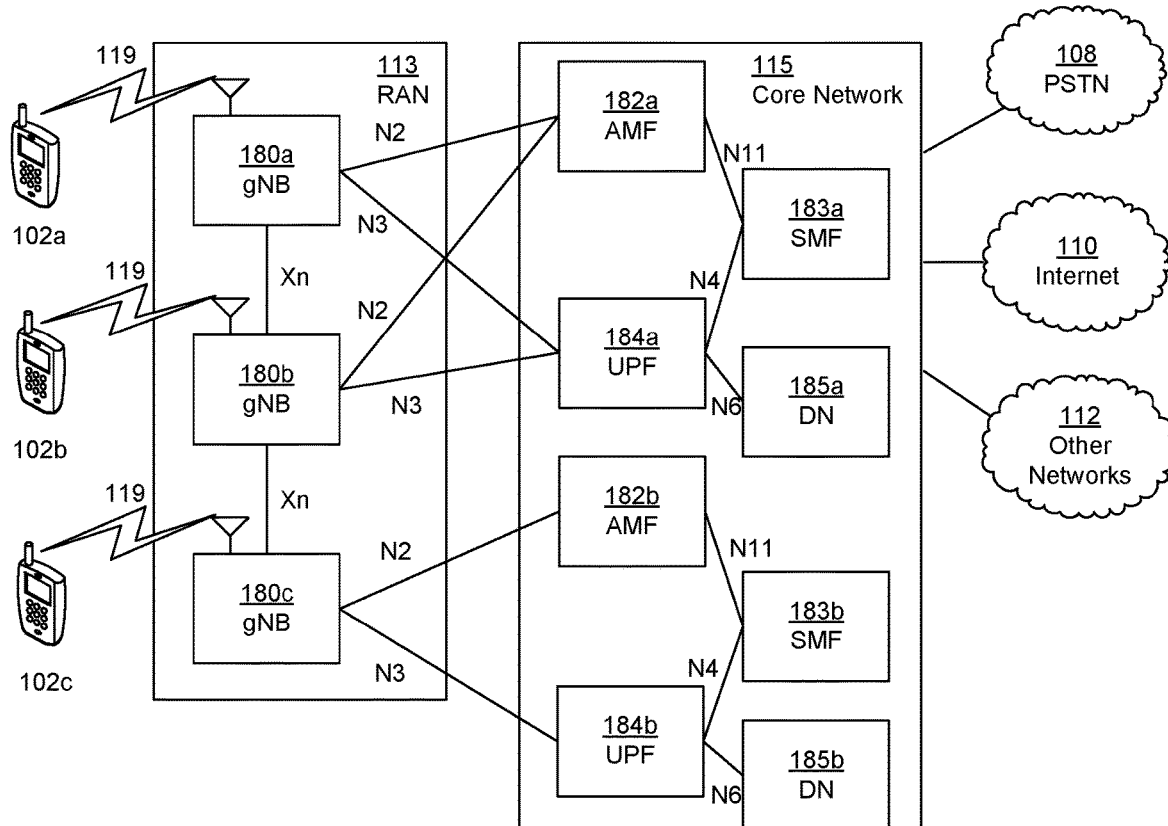
FIG. 1F is a system diagram illustrating still another example radio access network and still another example CN that may be used within the communications system illustrated in FIG. 1A.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1F, the gNBs 180a, 180b, 180c may communicate with one another over an Xn interface.

The CN 115 shown in FIG. 1F may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

Although the RAN 113 is disclosed herein as providing certain operations, it is contemplated that the gNBs 180a, 180b and 180c which are included in the RAN 113 may enable such operations.

Although the CN 115 is disclosed as providing certain operations, it is contemplated that the AMFs 182a, 182b, the SMFs 183a, 183b and/or the UPFs 184a, 184b which are included in the CN 115 may enable such operations.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although the WTRU is described in FIGS. 1A-1F as a wireless terminal, it is contemplated that in certain representative embodiments such a terminal may use (e.g., temporarily or permanently) wired communication interfaces with the communication network.

In certain representative embodiments, a MICO WTRU 102 may determine whether the MICO WTRU 102 performs a registration update, for example before a SR according to any of: a pre-configured flag, a network (NW) (e.g., NW 113/115) provided flag and/or other criteria, among others.

In certain representative embodiments, the MICO WTRU 102 may include a Temporary User ID (TUID) of the MICO WTRU 102 in a SR which, for example may enable WTRU information retrieval if the serving Access and Mobility Management Function (AMF) does not have a context (e.g., a WTRU context).

In certain representative embodiments, the MICO WTRU 102 may read identifiers of serving AMFs (e.g., an AMF 182a) from broadcast system information and may compare the identifiers to one or more stored TUIDs to determine whether the MICO WTRU 102 has moved to a new AMF (e.g., an AMF 182b).

In certain representative embodiments, the MICO WTRU 102 may indicate a preference to initiate a connection from the MICO WTRU 102 itself and the NW (e.g., NW 113/115) may refrain from releasing the connection of the MICO WTRU 102 (e.g., if such a preference is accepted).

In certain representative embodiments, the MICO WTRU 102 may reject the RAN signaling, for example to place the MICO WTRU 102 into an RRC_INACTIVE mode and the MICO WTRU 102 may remain in CONNECTED mode and/or may go to IDLE mode.

If the NW (e.g., NW 113/115) determines, desires or wants to update or is to update configuration parameters for the MICO WTRU 102 (e.g., Network Slice Selection Assistance Information (NSSAI), an extended discontinuous reception (eDRX), and/or a MICO periodic timer, among others), the NW 113/115 may use an SR procedure to trigger the MICO WTRU 102 to perform a registration procedure.

Representative MICO Mode

A "Mobile Originated Only" (MOO) function/procedure and/or feature may be a service requirement for Machine Type Communication (MTC). For example, the NW (e.g., NW 113/115) may reduce frequency of mobility management procedures for MOO devices. A Power Saving Mode (PSM) feature may address MOO for infrequent Mobile Terminated service requirements. The PSM mode may be similar to power-off, with the WTRU 102 remaining registered. The WTRU 102 may exit (e.g., may only exit) PSM mode when the WTRU 102 has Mobile Originated (MO) data and/or signaling. The WTRU 102 may not be reachable when the WTRU 102 is in PSM mode.

A MICO mode WTRU 102 may not be reachable (e.g., may always not be reachable) while in CM-IDLE. The core NW (CN) 115 may reject any request for downlink data or signaling delivery for a MICO WTRU 102 that is in IDLE mode. The WTRU 102 in MICO mode may be reachable (e.g., may be only reachable) for mobile terminated data and/or signaling when the MICO WTRU 102 is in CM-CONNECTED mode. A MICO WTRU 102 may initiate a CM-IDLE mode to CM-CONNECTED mode switch procedure due to any of the following triggers: (1) a change in the MICO WTRU 102 (e.g., a change in its configuration), for example that may require and/or cause an update to the MICO WTRU registration with the NW 113/115; (2) a registration timer (e.g., a periodic registration timer) that may expire; (3) MO data that may be pending; and/or (4) MO signaling that may be pending (e.g., a SM procedure that may be initiated), among others.

The MICO WTRU 102 may negotiate with the NW 113/115 as to whether the MICO WTRU 102 may enter the MICO mode. The WTRU 102 may indicate a preference for the MICO mode during an initial registration and/or a registration update. The AMF 182a may determine whether the MICO mode is allowed for the WTRU 102 based on: (1) a local configuration, (2) WTRU subscription information, (3) WTRU indicated preferences; and/or (4) NW policies. The AMF 182a may indicate the determination to the WTRU (e.g., the MICO WTRU determination) 102 during the registration procedure.

A "Mobile Deregistration at the End of Communication" function/procedure and/or feature, by which the WTRU 102 may perform deregistration at the end of communication without additional NAS signaling may be implemented. The WTRU 102 may indicate a preference for Deregistration At the End of Communication (DAEC) during a registration procedure. The AMF 182a may determine whether the DAEC is supported for the WTRU, and may indicate the support for DAEC during the registration signaling. When the AMF 182a applies the DAEC to the WTRU 102, the AMF 182a may consider that the WTRU 102 may enter RM-DEREGISTERED at the release of an N2 connection for the WTRU 102, and that the WTRU 102 may move to RM-DEREGISTERED when leaving the CM-CONNECTED mode. This type of WTRU 102 may share a common characteristic with the MICO WTRU 102 in that both may be unreachable except in CONNECTED mode.

Although a MICO WTRU 102 is described hereinafter, various representative embodiments herein are equally applicable to other type of WTRUs 102 including a DAEC WTRU 102 and other mobile WTRUs 102.

In certain representative embodiments, representative procedures may be implemented, for example to enable a MICO WTRU 102 to be recognized in a serving AMF 182.

Figure 2:
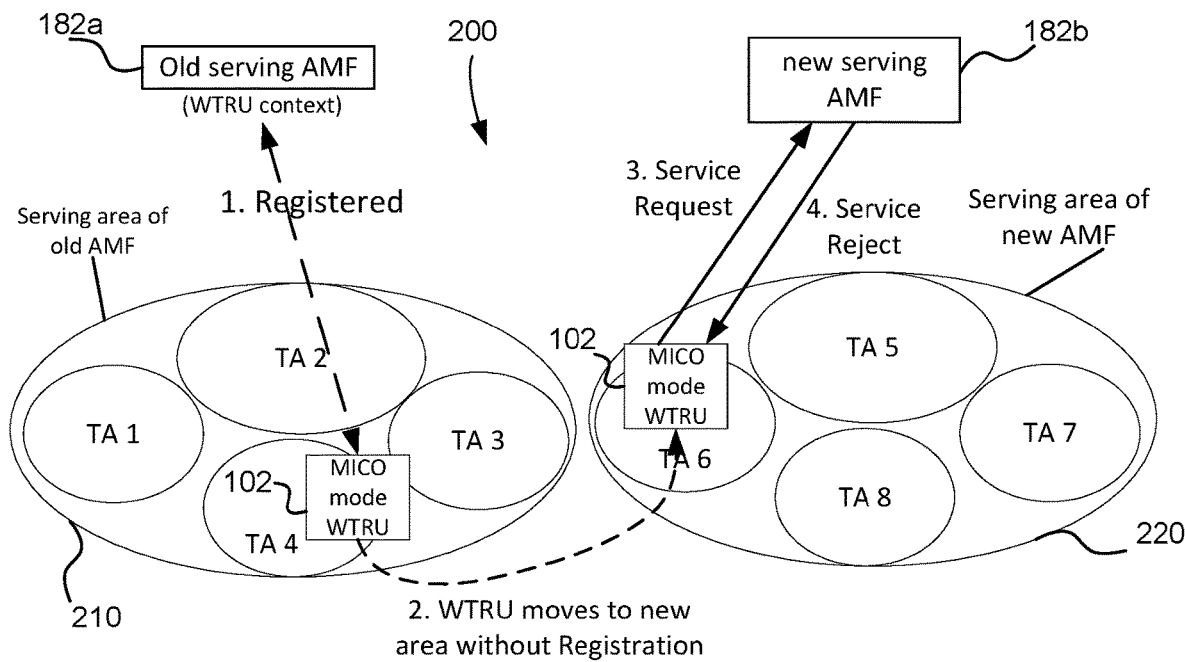
FIG. 2 is a diagram illustrating a representative MICO WTRU moving to a new serving AMF.

FIG. 2 is a diagram illustrating a representative MICO WTRU 102 moving to a new serving AMF 182b.

Referring to FIG. 2, in representative network 200, a WTRU 102 may be located in a first registration area 210 including a first plurality of tracking areas TA1-TA4 and may be served by a first AMF 182a. The WTRU 102 may move to a second serving area 220 including a second plurality of tracking areas TA5-TA8 that may be served by a second AMF 182b. The WTRU 102 (e.g., a typical WTRU or non-MICO WTRU) may be assigned the first registration area 210 from which the WTRU is being served and may perform a registration area update when the WTRU 102 leaves the configured registration area (e.g., the first registration area 210). The NW 113/115 may limit the paging area to the registration area 210 or 220 of the WTRU 102. MICO WTRUs 102 are not supposed to and/or do not receive paging in IDLE mode and a normal registration area configuration may not be used for the MICO WTRUs 102. A WTRU 102 in a MICO mode (hereafter sometimes referred to as a MICO WTRU) may be assigned an "all PLMN" registration area such that the MICO WTRU 102 may not perform registration area updates (e.g., except for periodic registration update) when the MICO WTRU 102 remains in the same registered PLMN. The MICO WTRU 102 may move into a new area which is not served by the first AMF 182a that the MICO WTRU 102 previously registered with. For example, a new AMF (e.g., the second AMF 182b) may be selected to serve the MICO WTRU 102 when the MICO WTRU 102 is to initiate a connection (e.g. with a SR message and/or a periodic registration update). The new AMF (e.g., the second AMF 182b) may reject the SR or the periodic registration update (e.g., because the new AMF 182b may not recognize the MICO WTRU 102), which may trigger the MICO WTRU 102 to register again.

For example, first, the MICO WTRU 102 may be registered with the old serving AMF 182a using a WTRU context via a gNB 180a. Then, the MICO WTRU 102 may move to a new area without registration. Next, the MICO WTRU 102 may send a SR to a new serving AMF 182b via a new gNB 180c. Last the AMF may send a service reject to the MICO WTRU 102 via the gNB 180c, for example because the AMF 182b does not recognize the MICO WTRU 102.

If this scenario happens frequently (e.g., more frequently, for example, above a threshold level), the "service-reject-then-re-register" approach may significantly delay the mobile initiated communication and may imposes extra signaling overhead to the NW 113/115.

For example, registration may be performed by the MICO WTRU 102 before an SR, for example to avoid a Service Reject, and to avoid extra signaling overhead. The MICO WTRU 102 may be provided, by the NW 113/115, a Within Serving AMF (WSA) area, which may be a list of Tracking Areas, and, for example, may enable the MICO WTRU 102 to determine whether the MICO WTRU 102 is within (e.g., still within) the serving area of the registered AMF 182a. When (e.g., only when) the MICO WTRU 102 determines that the MICO WTRU 102 is outside of the serving area of the registered AMF 182a, the MICO WTRU 102 may initiate the registration procedure before any originated communication.

Representative Procedures to Keep a MICO WTRU in CONNECTED Mode

In general, a RAN 113 (e.g., including one or more gNBs 180) may initiate a connection release according to one or more conditions such as inactivity (e.g., user inactivity) and/or radio communication failure. For example, the RAN 113 may maintain an inactivity timer for the WTRU 102 and when no data activity is detected before the timer expires, the RAN 113 may initiate the connection release. For the MICO mode, the WTRU 102 is only reachable in the CONNECTED mode. If the connection is released prematurely and data is still pending, there may be no way to bring the MICO WTRU 102 back to CONNECTED mode until the next time the MICO WTRU 102 initiates a connection. In certain representative embodiments, the WTRU 102 in the MICO mode may make connection release decisions. In other representative embodiments, the NW 113/115 may maintain the MICO WTRU 102 in CONNECTED mode longer, under certain criteria (e.g., when the NW 113/115 determines a longer connection is appropriate and/or necessary).

The AMF 182a may maintain a connection timer for the MICO WTRU 102. When the RAN 113 inactivity timer expires, the RAN 113 may request an N2 connection (e.g., a signaling connection between the RAN 113 and the AMF 182a) release. If the AMF 182a determines that the MICO WTRU connection is not to be released according to its own connection timer, the AMF 182a may reject the release request of the RAN 113 and the RAN 113 may maintain the MICO WTRU 102 in CONNECTED mode. In certain representative embodiments, a procedure may be implemented to make the AMF 182a aware of WTRU data activities, for example to enable the AMF 182a to maintain a connection timer and/or inactivity timer. In certain representative embodiments, a procedure may be implemented to prevent the RAN 113 from initiating a RRC connection release when the RAN 113 requests to release the N2 connection, for example by the AMF 182a by providing the RAN 113 with WTRU-specific inactivity information (e.g., timer information).

Representative Procedures to Prevent MICO WTRU from Entering RRC Inactive Mode

Figure 3:
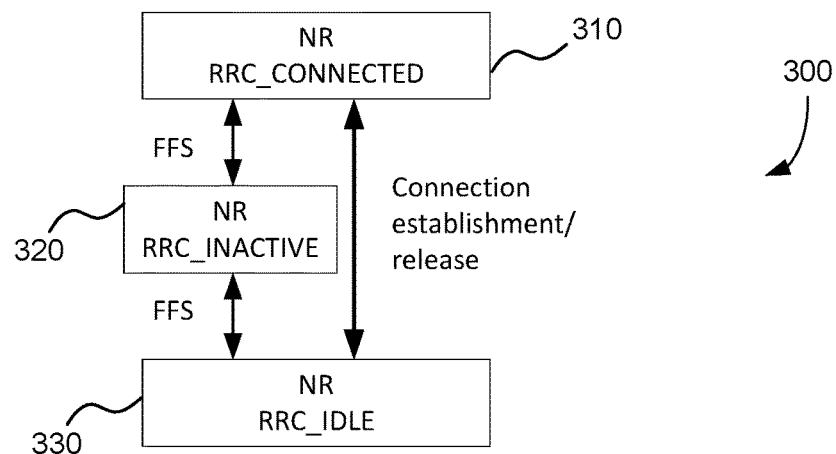
FIG. 3 is a diagram illustrating representative states including a representative RRC_INACTIVE state in a 5G New Radio.

FIG. 3 is a diagram illustrating representative states including a representative RRC_INACTIVE state (e.g., a New RRC_INACTIVE state) in a 5G New Radio (e.g., for a WTRU 102).

Referring to FIG. 3, in a RAN 113 (e.g., a 5G RAN), RRC states 300 may include any of: (1) an RRC_CONNECTED state 310; (2) an RRC_INACTIVE state 320; and/or (3) an RRC_IDLE state 330, among others. For WTRUs 102 in an INACTIVE state 320, the Core Network-Access Network (CN-AN) connection may be maintained as in the CONNECTED state 310. The CN-AN connection may be between the (RAN) and the CN and may have both control plane (CP) (for example, an N2 interface in 5G for signaling) and user plane (UP) (for example, an N3 interface in 5G for data) connections. The WTRU 102 in the INACTIVE state 320 may behave more like a WTRU in an IDLE mode. For example, the WTRU 102 in the INACTIVE state 320 may follow a cell selection/reselection procedure when the WTRU 102 changes cells. The CN 115 may not be aware of the INACTIVE state 320 of the WTRU 102 and may continue to consider the WTRU 102 to be in CONNECTED state 310, so CN paging may not be performed towards the INACTIVE WTRU 102. Procedures may be implemented to determine by the CN 115 that the WTRU 102 is in an INACTIVE state 320 and not in a CONNECTED state 310, for example to enable proper paging of MICO WTRUs 102. As an example, when downlink (DL) data is received from the CN 115, an anchor RAN 113 may initiate paging and may manage a RAN paging area for the INACTIVE WTRU 102. In certain representative embodiments, conditions may be set forth that trigger a state switch between the RRC_INACTIVE state 320 and one of the two other states 310 or 330.

The benefit of having an INACTIVE state 320 may include power saving and reduced signaling overhead (for example brought by the frequent RRC_IDLE< >RRC_CONNECTED switch). For MICO WTRUs 102, both the power saving and signal reduction benefit may not be useful and/or needed, and putting a MICO WTRU 102 in an RRC_INACTIVE mode/state 320 may incur potential technical complexities. As such, in certain representative embodiments, the MICO WTRU 102 may be prevented from entering the RRC_INACTIVE state 320.

Representative Procedures Having Long Periodic Timer (e.g., to Prevent the WTRU From Performing Registration Update)

When a WTRU 102 informs the NW 113/115 of certain configuration modifications or negotiates certain parameters, the WTRU 102 may trigger certain registration update procedures such as a Routing Area Update (RAU) and/or a Tracking Area Update (TAU). The registration update may be done, for example for the WTRU 102 to inform the NW 113/115 of some internal changes including any of: (1) a DRX Cycle, and/or (2) certain capability parameters, among others. When the WTRU 102 triggers the RAU procedure and/or the TAU procedure, the NW 113/115 may reply with an "Accept" message. The "handshake" may work as a negotiation between the two entities.

It is contemplated that for 5G systems, there may be scenarios/situations where the WTRU 102 (e.g., a MICO WTRU) may not have a chance to start a registration update procedure, (for example, when the WTRU 102 has a long periodic registration timer). During an IDLE mode 330, if a periodic registration timer is running (since the WTRU 102 may only send registration update message when the periodic timer expires), the WTRU 102 may send a SR message. The periodic registration timer may be reset when the WTRU 102 goes back to the IDLE mode 330. The same situation may occur while the periodic timer is running. The WTRU 102 may not be able to perform the registration procedure for a long time. In certain representative embodiments, procedures may be implemented for the WTRU 102 to negotiate with the NW 113/115 in case of some internal configuration changes, and/or for any other reason.

Representative Procedures for MICO WTRUs with "all PLMN" Registration Area

When a MICO WTRU 102, which is configured with an "all PLMN" registration area, moves to a new area that is outside of the serving area (e.g., scope) of its registered AMF 182a, the MO connection request (e.g. SR) may be rejected by the new serving AMF 182b and the WTRU 102 may have to re-register with the new AMF 182b before the WTRU 102 can communicate. If the MICO WTRU 102 always performs re-registration preventively before SR, for example to avoid potential service rejections, signaling may be wasted when the WTRU 102 is still in the serving area 210 of the registered AMF 182a. In certain representative embodiments, procedures may be implemented, for example to ensure that unnecessary re-registration does not take place often.

In certain representative embodiments, the MICO WTRU 102 may receive an indication from a NW entity (e.g., of the NW 113/115) that the MICO WTRU 102 should (e.g., should always) or is to perform a registration procedure before a connection request. The indication may be sent in the same Registration Accept message that confirms an MICO mode for the WTRU 102. The NW 113/115 may choose to set the indication when the NW 113/115 configures the "all PLMN" registration area for the MICO WTRU 102. Any of the following may be taken into consideration for setting the indication including:

(1) if the profile of the WTRU 102 indicates that the communication of the WTRU 102 (communication needs and/or uses of the WTRU 102) may be or is infrequent (e.g., very infrequent or below a threshold level), the NW 113/115 and/or a NW entity 180, 182-184 may choose to set and/or may set the indication. Even though the re-registration procedure before connection request sometimes may not be necessary and/or appropriate, the re-registration procedure may be tolerated (for example, because the re-registration procedure may not or does not happen often (e.g., above a threshold level)). In certain representative embodiments, the profile of the WTRU 102 may indicate that the WTRU's communication needs may be frequent and the NW 113/115 (e.g., a NW entity 180, 182-185) should not or is not to set the indication.

(2) if the "mobility pattern" of the WTRU 102 indicates that the WTRU 102 moves frequently and a roaming range of the WTRU 102 is beyond a serving area 210 of the AMF 182a (e.g., which may mean that the WTRU 102 is likely (e.g., more likely), for example above a threshold rate, to be out of the serving area 210 of the AMF 182a), the NW 113/115 and/or a NW entity 180, 182, 183, 184 and/or 185 may set (e.g., choose to set) the indication. If the mobility pattern of the WTRU 102 indicates that the WTRU 102 is stationary, substantially stationary and/or roams (e.g., only roams) in an area (e.g., a limited area), the NW 113/115 and/or a NW entity 180, 182, 183, 184 and/or 185 may not set the indication.

Figure 4:
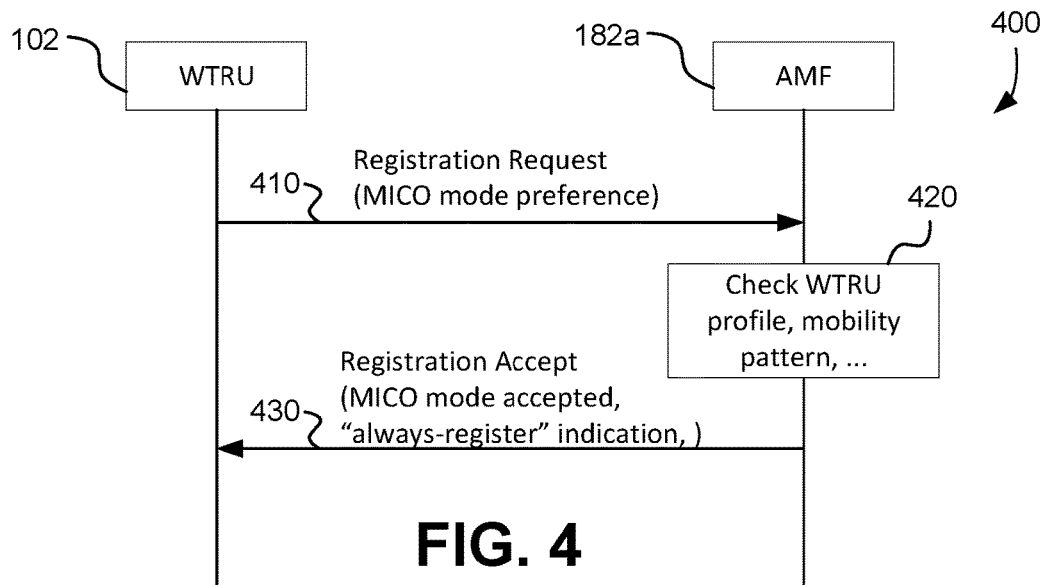
FIG. 4 is a diagram illustrating a representative registration procedure.

FIG. 4 is a diagram illustrating a representative registration procedure 400 in which the NW 113/115 (e.g., the AMF 182a or another NW entity 182-185) may provide "always register before service request" (always RBSR) indication to the WTRU 102.

Referring to FIG. 4, at 410 a WTRU 102 may send a registration request including information indicating a MICO mode preference to an AMF 182a. At 420, the AMF 182a may check the WTRU profile, mobility patterns and other information regarding the WTRU 102. At 430, the AMF 182a may send a registration accept including information indicating that a MICO mode accepted and the always RBSR indication to the WTRU 102. In certain representative embodiments, the always RBSR indication may be pre-configured, for example in the MICO WTRU 102. The WTRU 102 may include the pre-configured indication, together with a MICO mode preference, during the registration procedure.

If a WTRU 102 is in the MICO mode and this always RBSR indication is set, for example by signaling from the NW 113/115 (e.g., the AMF 182 and/or other NW entity 183-185) and/or via a preconfiguration, the WTRU 102 may check the following criteria to determine whether the WTRU 102 may or is to perform the RBSR (e.g., the always RBSR).

The NW 113/115 (e.g., the AMF 182) and/or the WTRU 102 may determine whether the WTRU 102 has been configured with an "all PLMN" registration area. If the NW 113/115 and/or the WTRU 102 determines that the WTRU 102 has not been configured with the "all PLMN" registration area, the WTRU 102 may not perform (e.g., may not necessarily perform) the RBSR (e.g., always RBSR). For example, the WTRU 102 may not send a registration request with an MICO preference and/or the AMF 182 executing a check of the profile of the WTRU 102 may not send a registration accept that includes an indication that: (1) the MICO mode is accepted; and/or (2) an always RBSR indication.

The WTRU 102 may determine whether the WTRU 102 has moved out (e.g., really moved out) of its Tracking Area (TA) (e.g., that the WTRU 102 has moved (e.g., just moved) from a previous TA to a new TA). The WTRU 102 may read the TA identifier of the current TA when the WTRU 102 wakes up for mobile originated service, and may compare the current TA identifier (e.g., which was read) to the stored TA identifier. If the current TA identifier and the stored TA identifier are the same, the WTRU 102 may not have moved out of the TA from which the WTRU 102 previously registered with the NW 113/115 (e.g., the AMF 182 or other NW entity 183-185). The WTRU 102 may not perform registration again, for example because the WTRU 102 is still within the service area of the previously registered AMF 182.

If the WTRU 102 has determined that the WTRU 102 may or is to perform a Registration update procedure before a SR, the WTRU 102 may initiate the Registration with a flag (e.g., an "Active Flag") that may indicate that data is or may be pending after the Registration procedure. In this case, the following SR message may not be sent.

Figure 5:
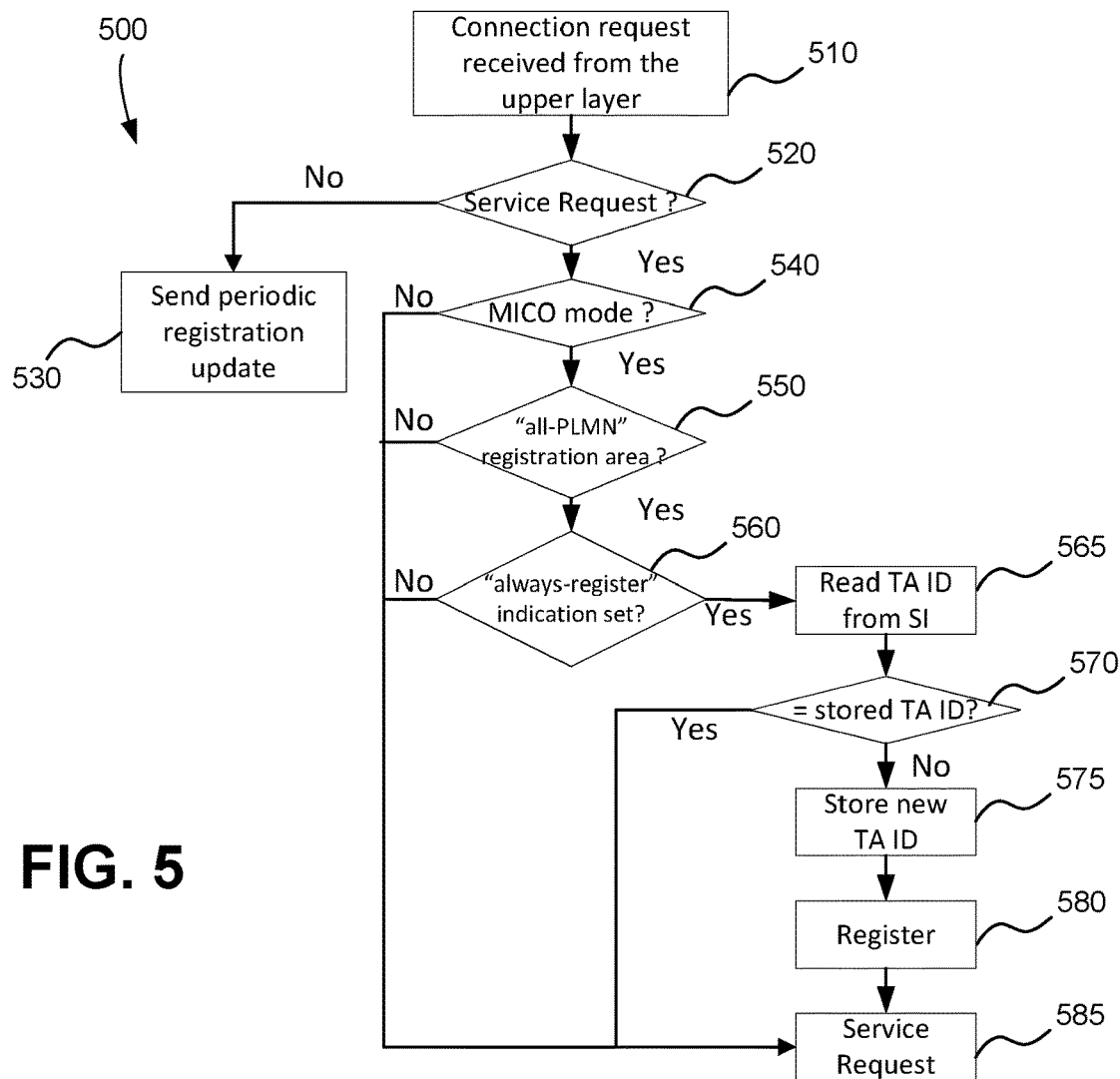
FIG. 5 is a diagram illustrating a representative determination procedure.

FIG. 5 is a diagram illustrating a representative determination procedure 500 (e.g., for the MICO WTRU 102 to determine (e.g., to decide) whether registration should, may or is to be performed before a SR).

Referring to FIG. 5, the representative determination procedure 500 may include, at block 510, in the WTRU 102, a connection request being received from an upper layer. At block 520, the WTRU 102 may determine whether a SR is desired and/or need to be sent to the NW 113/115 based on the connection request. If a SR is not desired and/or need to be sent to the NW 113/115, at block 530, the WTRU 102 may send one or more periodic registration updates. If a SR is desired and/or need to be sent to the NW 113/115, at block 540, the WTRU 102 may determine whether a MICO mode is set. If the MICO mode is not set, processing moves to block 585 to send the SR. If the MICO mode is set, at block 550, the WTRU 102 may determine that an "all PLMN" registration area is set. If the "all PLMN" registration area is not set, processing moves to block 585 to send the SR. If the "all PLMN" registration area is set, at block 560, the WTRU 102 may determine whether an "always-register" indication is set. If the always-register indication is not set at block 560, processing moves to block 585 to send the SR.

If the always-register indication is set, at block 565, the Tracking Area ID may be read (e.g., the most up to date Tracking Area ID may be read). At block 570, the WTRU 102 may compare the latest Tracking Area ID with the stored tracking area IDs to determine if a match exists. If a match exists at block 570, processing moves to block 585 to send the SR (e.g., without any prior registration update) (as the WTRU 102 is still within a tracking area that the NW 113/115 may associate with the WTRU 102). If a match does not exist, at block 575, the WTRU 102 may store the latest tracking area. At block 580, the WTRU 102 may register the WTRU 102 with the NW 113/115 (as the WTRU 102 is no longer within a tracking area that the NW 113/115 associates with the WTRU 102 such that a service reject can occur). At block 585, the WTRU 102 may send the SR to the NW 113/115.

Figure 6:
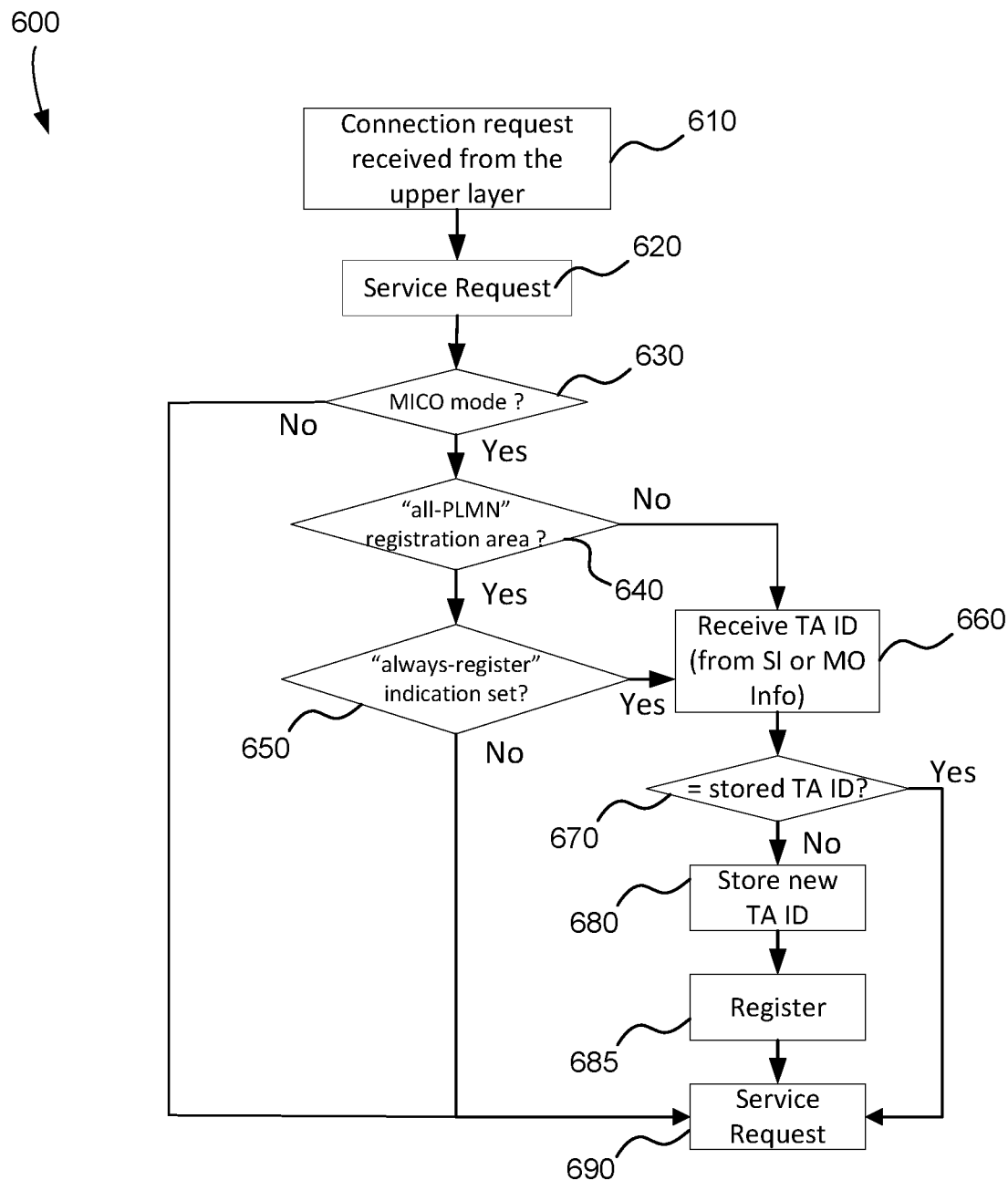
FIG. 6 is a diagram illustrating another representative determination procedure.

FIG. 6 is a diagram illustrating another representative determination procedure to determine whether registration should, may or is to be performed before a SR.

Referring to FIG. 6, the representative determination procedure 600 may include, at block 610, in the WTRU 102, a connection request being received from an upper layer. At block 620, the WTRU 102 may determine that a SR is desired and/or need to be sent to the NW 113/115 based on the connection request. At block 630, the WTRU 102 may determine whether a MICO mode is set. If the MICO mode is set, at block 640, the WTRU 102 may determine that an "all PLMN" registration area is set. If the MICO mode is not set, processing may move to block 690 to send a SR to the NW 113/115 (e.g., without any prior registration update). If the "all PLMN" registration area is set, at block 650, the WTRU 102 may determine whether an "always-register" indication is set. If the all PLMN" registration area is not set, processing may move to 660 to receive a Tracking Area ID from broadcast system information and/or a mobile originated operation. If the always-register" indication is not set, processing may move to block 690 to send a SR to the NW 113/115 (e.g., without any prior registration update). If the always-register" indication is set or processing has moved from block 640 to block 660, the Tracking Area ID is received and/or read from broadcast system information and/or a mobile originated operation. At block 670, the WTRU 102 may compare the received/read Tracking Area ID with one or more stored Tracking Area IDs to determine if a match exists. If a match exists, at block 670, processing moves to block 690 to send the SR (e.g., without any prior registration update) (as the WTRU 102 is still within a tracking area that the NW 113/115 associates with the WTRU 102). If a match does not exist, at block 680, the WTRU may store the received Tracking Area ID. At block 685, the WTRU 102 may register the WTRU 102 with the NW 113/115 (as the WTRU 102 may no longer be within a Tracking Area that the NW 113/115 can associate with the WTRU 102 such that a Service Reject can occur). At block 690, the WTRU 102 may send the SR to the NW 113/115.

Although the determination of whether the WTRU is in a registration area is disclosed to be based on Tracking Area Identifiers (TA IDs), one of skill in the art understands that it may be based on AMF IDs, in addition to or in lieu of TA IDs. For example, a received AMF Identifier (ID) may be matched to one or more stored AMF IDs to provide a similar registration area determination.

In certain representative embodiments, the MICO WTRU 102 may include a MICO mode indication and/or a TUID of the MICO WTRU 102 in the SR message. In other representative embodiments, the TUID being included in the SR may imply the MICO mode indication (e.g., a MICO mode preference) at the same time. In legacy WTRUs 102, triggering of the SR procedure is based on the whether the WTRU 102 is "registered" in the TA (e.g., on a TA list). The legacy WTRUs 102 do not provide any "area information" to the CN 115 when starting the SR procedure.

In certain representative embodiment, the WTRU 102 may or is to add a previous TA Identifier of the WTRU 102 to the SR message. The AMF 182a from the added previous TA Identifier may identify (e.g., uniquely identify) the WTRU 102, in case the WTRU 102 was allocated a TUID by the same AMF 182a. If the serving AMF 182b is a new AMF (e.g., the serving AMF 182b did not previously serve the WTRU 102) and/or the serving AMF 182b may not have a context of the WTRU 102, the new AMF 182b may not reject the SR, if the new AMF 182b receives: (1) the MICO indication, (2) the TUID and/or (3) the TA Identifier of where the WTRU 102 was allocated the TUID.

The new AMF 182b may map the information (e.g., all of the information) to an address of the old AMF 182a and may retrieve the WTRU context from the old AMF 182a, which may be derived from the TUID. The new AMF 182b may re-allocate a new TUID for the WTRU 102 after the SR procedure is handled.

Figure 7:
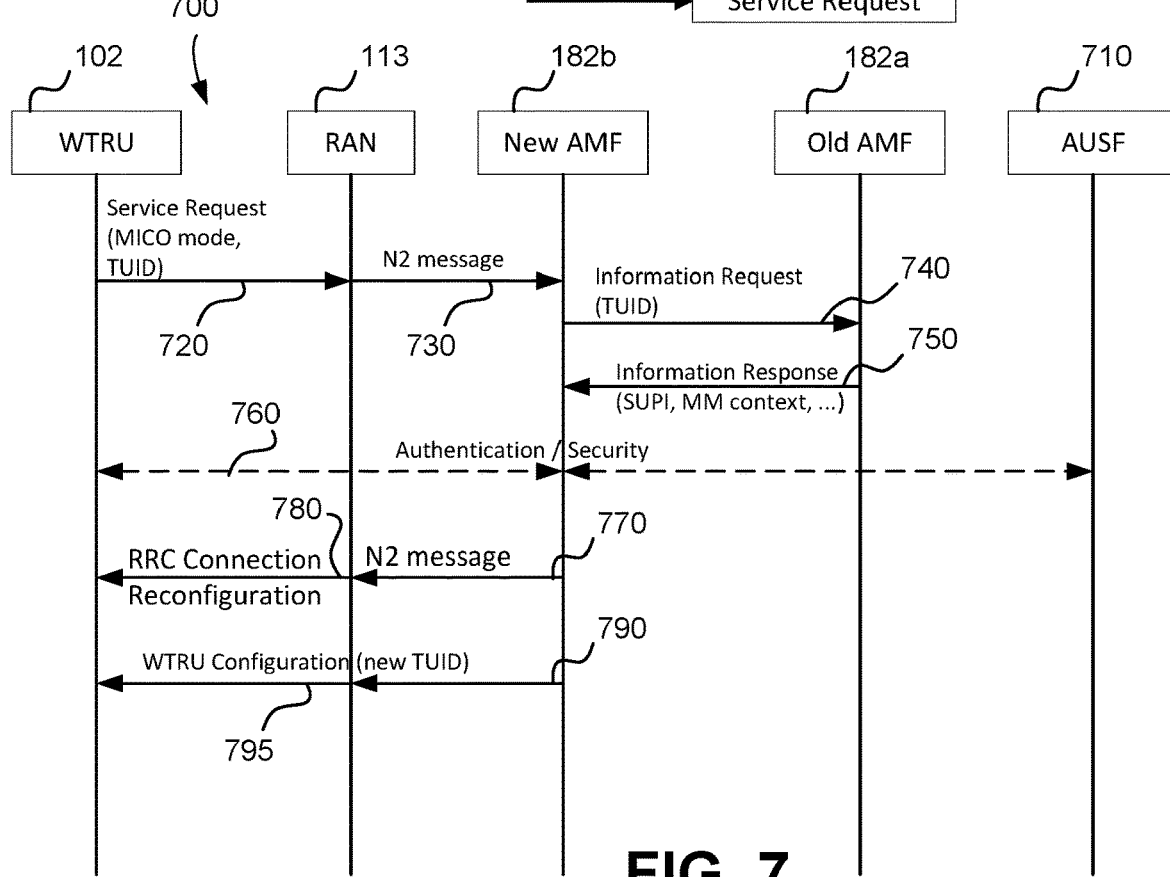
FIG. 7 is a diagram illustrating a representative Service Request (SR) triggered WTRU context retrieval procedure.

FIG. 7 is a diagram illustrating a representative SR triggered WTRU context retrieval procedure from an old AMF 182a (e.g., from an AMF that previously served the WTRU 102).

Referring to FIG. 7, the SR triggered WTRU context retrieval procedure 700 may include, at 720, that the WTRU 102 sends toward a new AMF 182b that serves the WTRU 102, an SR including, for example, a MICO mode indication (e.g., a MICO preference) and/or a TUID. At 730, the RAN 113 (e.g., a gNB 180) may forward the information from the SR via an N2 message to the new AMF 182b. At 740, the new AMF 182b may send an Information Request including the TUID of the WTRU 102 to the old AMF 182a. At 750, the old AMF 182a may send an Information Response including, for example, a Subscriber Permanent Identification (SUPI) (which may be similar to an IMSI) and/or a Mobility Management (MM) context (e.g., a collection of information related to UE's mobility management). At 760, an authentication/security operation may be performed between the WTRU 102 and the new AMF 182b and between the new AMF 182b and an AUthentication Server Function (AUSF) 710 (e.g., the network function that may handle WTRU authentication).

At 770, the new AMF 182b may send an N2 message to the RAN 113. The N2 message may include information to be sent via the RAN 113 to the WTRU 102 to enable a RRC Connection Reconfiguration. At 780, the RAN 113 may, based on the N2 message, send a RRC Connection Reconfiguration to the WTRU 102. At 790, the new AMF 182b may send a WTRU configuration including a new TUID toward the WTRU 102 via the RAN 113. At 795, the RAN 113 may forward the WTRU Configuration to the WTRU 102.

In certain representative embodiments, the RAN 113 in the NW 113/115 may broadcast a list of identifiers of the AMFs 182 whose serving area covers the RAN 113. The whole or part of the identifier of the AMF 182 may be broadcasted. If an AMF identifier appears in the broadcast information of the RAN 113, the RAN 113 is within the serving area of the AMF 182.

When a MICO WTRU 102 has a pending SR, the MICO WTRU 102 may read (e.g., may first read) the AMF identifiers from the RAN broadcasted information and may compare these AMF identifiers to the AMF ID section of the stored TUID. The AMF ID in the TUID is associated with the AMF 182, with which the WTRU 102 has registered, if the same AMF ID appears in the broadcast information of the current RAN and the WTRU 102 is within (e.g., still within) the serving area of the last registered AMF 182. In this case, the WTRU 102 may send an SR, for example, immediately (e.g., right away). In certain representative embodiments, the WTRU 102 may initiate a registration procedure prior to or before sending the SR (e.g., first initiate a registration procedure and then send an SR, for example only sending the SR after the registration of the WTRU 102).

Figure 8:
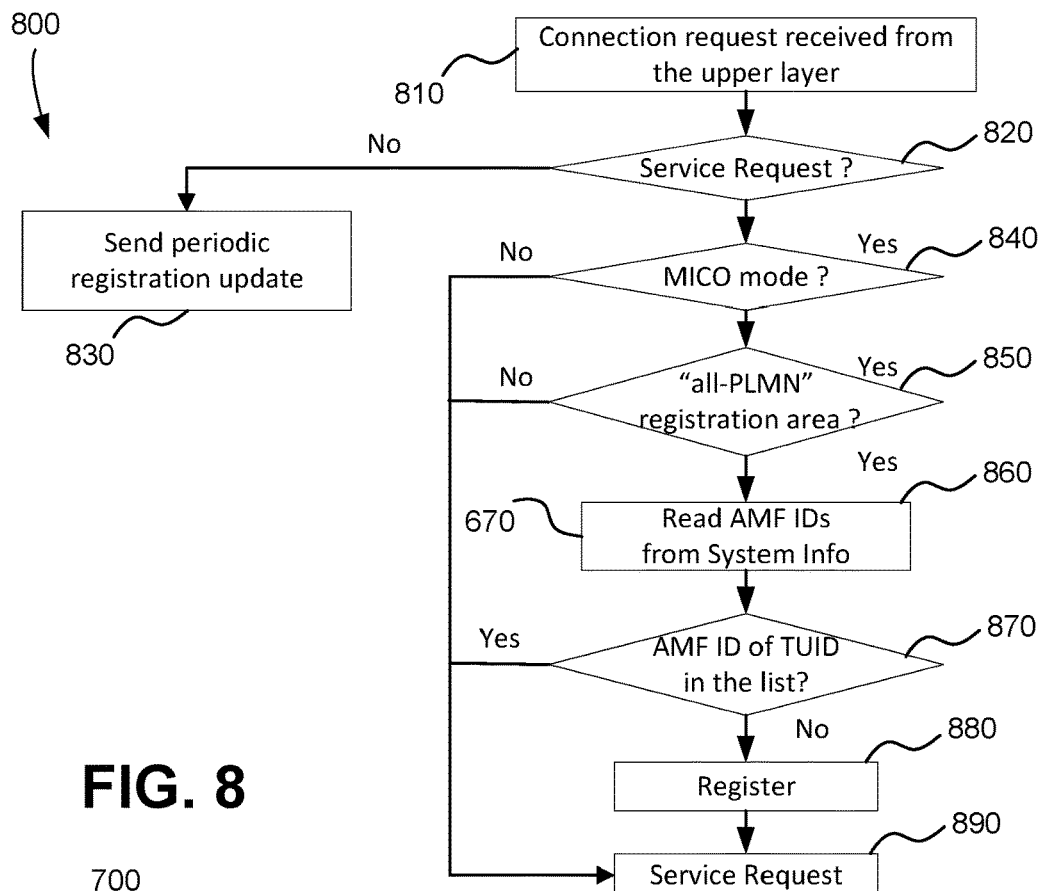
FIG. 8 is a diagram illustrating a Registration/SR procedure.

FIG. 8 is a diagram illustrating a Registration/SR procedure.

Referring the FIG. 8, the Registration/SR procedure 800 may include, at block 810, in the WTRU 102, a connection request being received from an upper layer. At block 820, the WTRU 102 may determine whether a SR is desired and/or need to be sent to the NW 113/115 based on the connection request. If an SR is not desired and/or need to be sent to the NW 113/115, at block 830, the WTRU 102 may send one or more periodic registration updates. If the SR is desired and/or need to be sent to the NW 113/115, at block 840, the WTRU 102 may determine whether a MICO mode is set. If the MICO mode is not set, processing may move to block 890 to send the SR. If the MICO mode is set, at block 850, the WTRU 102 may determine that an "all PLMN" registration area is set. If the "all PLMN" registration area is not set, processing may move to block 890 to send the SR. If the "all PLMN" registration area is set, at block 860, the WTRU 102 may read the AMF IDs from broadcast system information. At block 870, the WTRU 102 may compare the read AMF ID associated with the TUID with the AMF IDs from the broadcast system information (e.g., in the list of AMF IDs) to determine whether the AMF ID associated with the TUID of the WTRU 102 is in the list.

If the AMF ID of the AMF 182 associated the TUID of the WTRU is in the list at block 870, processing may move to block 890 to send the SR (e.g., without any prior registration update) (as the WTRU 102 is still served by one of the AMFs 182, for example broadcast in the system information. If the AMF ID associated with the TUID of the WTRU 102 is not in the list, at block 880, the WTRU 102 may register the WTRU 102 with the NW 113/115 (as the WTRU 102 may no longer be served by a AMF 182 corresponding to a AMF ID on the list such that a service reject can occur). At block 890, the WTRU 102 may send the SR to the NW 113/115 (e.g., the AMF 182).

For example, the WTRU 102 may determine if the WTRU 102 is within the AMF's service area 210 or 220 by reading AMF IDs in the System Information (SI).

In certain representative embodiments, the MICO WTRU 102 may start or restart a timer after a registration (e.g., each registration, for example including periodic registration updates). The length of the timer may indicate the period of time since a last registration (e.g., during which period, the WTRU 102 is likely to be within (e.g., still be within) the service area 210 or 220 of the registered AMF 182a or 182b). When the MICO WTRU 102 needs to or is to send a SR, the MICO WTRU 102 may check if the timer is running. If the timer is running, the WTRU 102 is likely (e.g., very likely, for example above a threshold level) to be within the same service area 210 or 220 of the last registered AMF 182a or 182b and the MICO WTRU 102 may send the SR, for example immediately and/or right away. In certain representative embodiments, the WTRU 102 may or is likely to be out of the service area 210 or 220 of the last registered AMF 182*a* or 182*b* and the MICO WTRU 102 may perform (e.g., may need to perform) registration again before sending the SR. The length of the timer may be preconfigured in the WTRU 102 or provided by the NW 113/115 (e.g., the AMF 182 or other NW entity 180, and 183-185).

Representative Procedure for Keeping MICO WTRU in Connected Mode

To keep the MICO WTRU 102 in CONNECTED mode longer (e.g., reasonably longer or for more than a threshold period), the NW 113/115 (e.g., the AMF 182 or other NW entities 180, 183-185) may determine that the WTRU 102 has a requirement (e.g., to remain in CONNECTED mode). The NW 113/115 may have difficulty to make this determination based on the WTRU profile. Certain assistance information from the WTRU 102 may be used in this determination.

In certain embodiments, the MICO WTRU 102 may include in the SR an indication of the characteristics of the service which enables the NW 113/115 to determine that the WTRU 102 is to be or needs to be kept in CONNECTED mode longer than usual. The indication of the service characteristics may include (1) a delay tolerance value and/or a "high-level delay-tolerant" indicator; and/or (2) a latency value and/or "high-latency" indication, among others, for example to provide a threshold that may be: (1) WTRU-specific; (2) application-specific; (3) service-specific; and/or (4) class-specific (e.g., device class-specific) among others. For example, a specific WTRU 102 may have a specific delay tolerance, a specific latency, a specific application executing, a specific service requirement, and/or a specific device class, among others that may be considered when the MICO WTRU 102 is in the CONNECTED mode (for example to avoid prematurely moving into another mode (e.g., disconnecting)).

In certain representative embodiments, the MICO WTRU 102 may include in the SR information or a flag indicating a preference that the connection release may be or is to be initiated by the WTRU 102 itself and not initiated by the NW (e.g., the RAN 113 or the CN 115). After receiving the SR with the preference indication, the NW 113/115 may determine whether to allow the WTRU 102 to initiate (e.g., whether the RAN 113 or the NW 113/115 is allowed to let the WTRU 102 initiate) the connection release based on WTRU subscription data and/or NW policies. If connection release by the WTRU 102 is accepted, the NW (e.g., the CN 115 or the RAN 113) may instruct the other one of the RAN 113 or the CN 115) not to initiate the connection release for the WTRU 102. When the WTRU 102 has determined autonomously (e.g., by itself) that the WTRU 102 has finished data communication, the WTRU 102 may initiate a connection release through any of: (1) a NAS procedure and/or (2) a RRC procedure. The WTRU 102 may start a timer after the WTRU 102 enters the CONNECTED mode. If the timer expires and the data communication of the WTRU 102 is not completed and/or the WTRU 102 cannot determine whether the data communication is completed, the WTRU 102 may or is to initiate a connection release (e.g., a connection release anyway).

Figure 9:
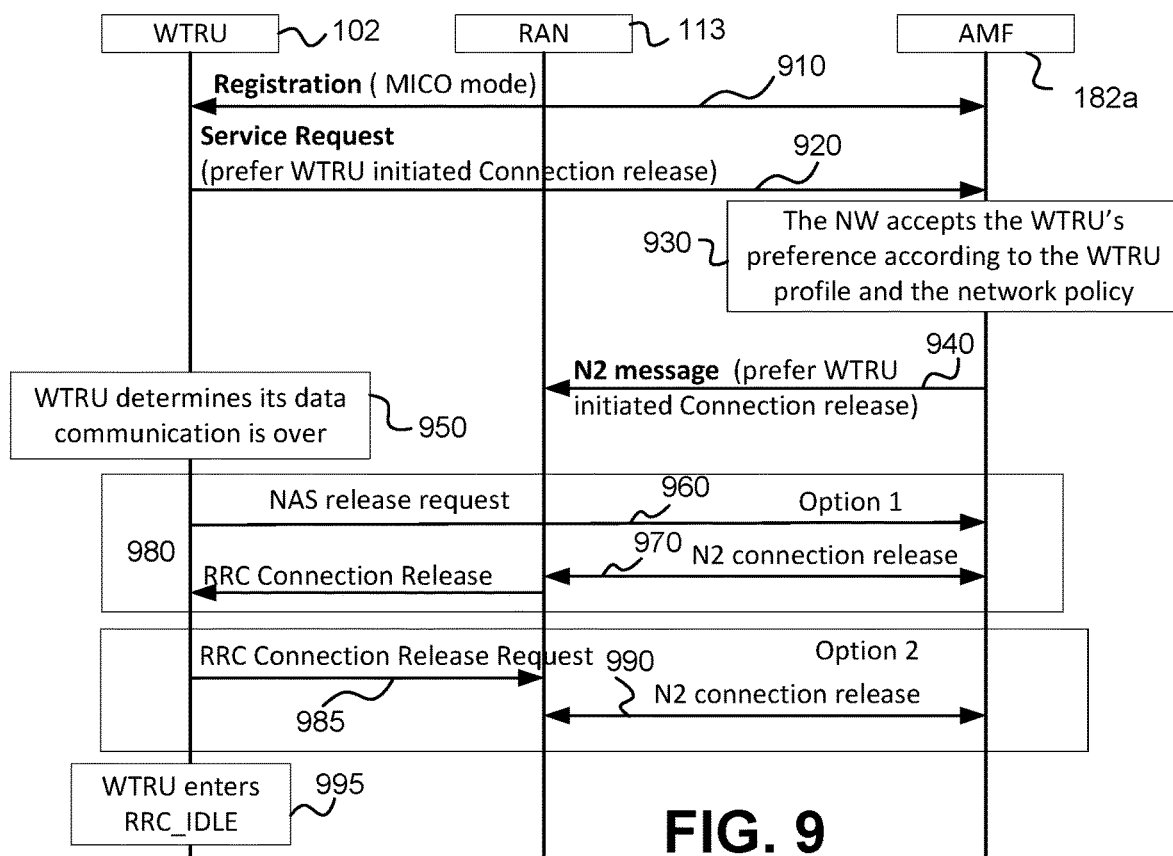
FIG. 9 is a diagram illustrating a representative MICO WTRU-initiated Connection release procedure.

FIG. 9 is a diagram illustrating a representative MICO WTRU initiated Connection release procedure.

Referring to FIG. 9, the representative MICO WTRU initiated Connection release procedure 900 may include, at 910, a registration between the AMF 182*a* and the MICO WTRU 102 via the RAN 113. The registration may include MICO mode information indicating that the WTRU is in a MICO mode. At 920, the MICO WTRU may send a SR via the RAN 113 to the AMF 182*a* and may include information indicating that the WTRU 102 prefers a WTRU initiated Connection release (for example to reduce and/or substantially eliminate a premature release by the NW 113/115). At 930, the NW 113/115 (e.g., via the AMF 182*a*) may accept the WTRU's preference according to and/or based on a profile of the MICO WTRU 102 and one or more network policies. At 940, the AMF 182*a* may send a N2 message to the RAN 113 (e.g., the gNB 180) to establish the preference (e.g., for a WTRU initiated Connection release). At 950, the MICO WTRU 102 may determine that data communication is complete. In certain representative embodiments, at 960, 970 and 980, the WTRU 102 may initiate and complete a connection release via a NAS initiated message. In other representative embodiments, at 985 and 990, the WTRU 102 may initiate and complete a connection release via a RRC initiated message.

In a first option, at 960, the WTRU 102 may send a NAS release request to the AMF 182*a* via the RAN 113. At 970, an N2 connection release is performed between the AMF 182*a* and the RAN 113. At 980, the RAN 113 may send a RRC Connection Release to the WTRU 102 to release the RRC connection. In a second option, at 985, the WTRU 102 may send a RRC Connection Release Request to the RAN 113. At 990, an N2 connection release is performed between the AMF 182*a* and the RAN 113.

At 995, the MICO WTRU 102 may enter RRC_IDLE mode after either the first or second option is complete.

In certain representative embodiments, the MICO WTRU 102 may in the SR include information indicating a preferred "inactivity time period" before the connection may be released. The NW 113/115 may determine whether the WTRU 102 preferred inactivity period indicated in the SR may be accepted based on WTRU subscription data and/or NW policies. If the WTRU preferred inactivity period indicated in the SR is accepted, the NW (e.g., CN 115) may instruct the RAN 113 to set the "inactivity timer" based on the preferred inactivity period value.

The representative procedures described herein may apply to MICO WTRUs that perform deregistration at the end of a communication.

Figure 10:
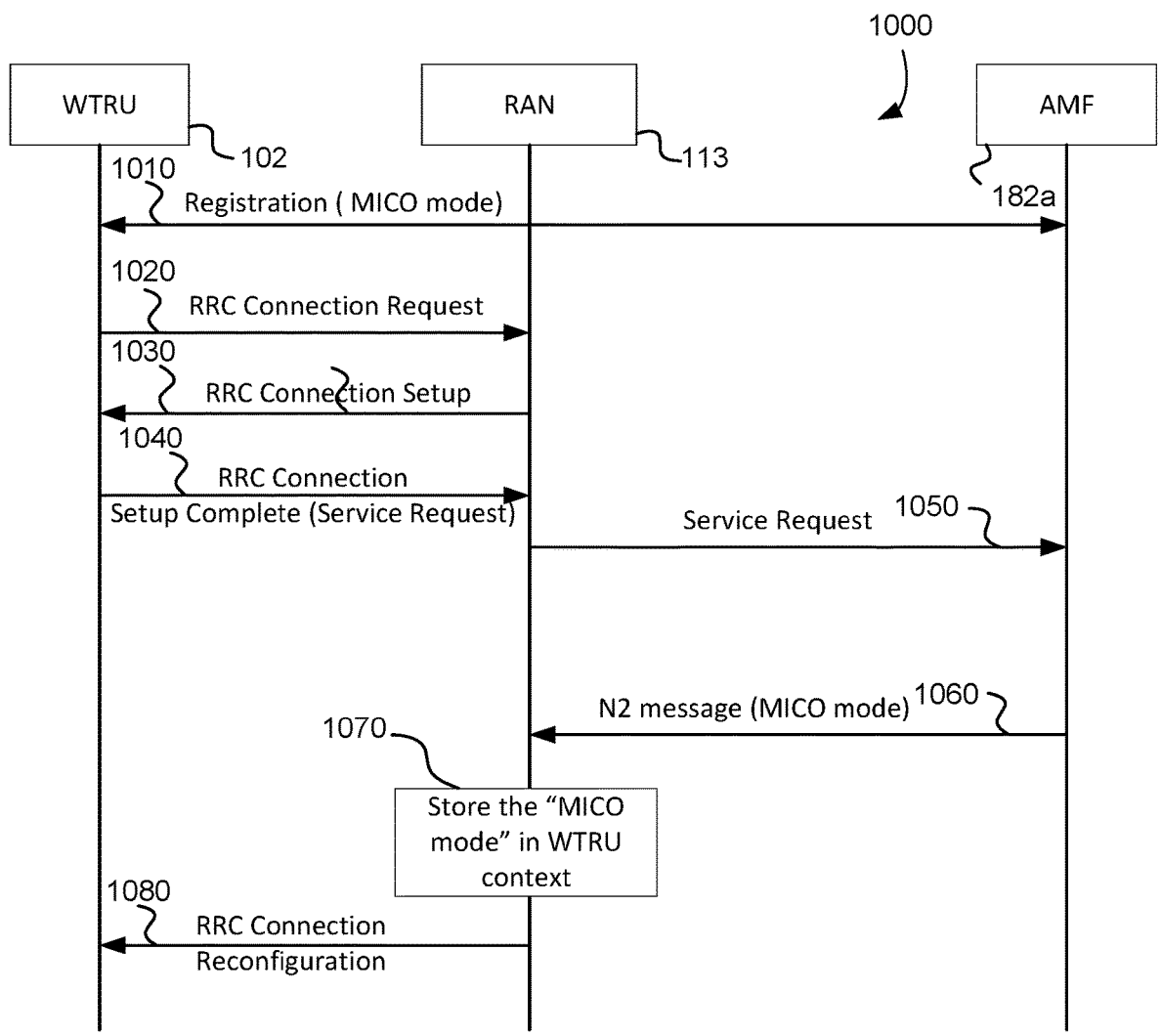
FIG. 10 is a diagram illustrating a representative procedure in which a RAN is made aware of a MICO mode of a WTRU.

Representative Procedures for Preventing MICO WTRUs From Entering an RRC_INACTIVE State FIG. 10 is a diagram illustrating a representative procedure in which a RAN is aware of (e.g., made aware of) a MICO mode of a WTRU via N2 signaling.

Referring to FIG. 10, in the representative procedure 1000, at 1010, a registration is performed between the AMF 182*a* and the MICO WTRU 102 via the RAN 113. The registration may include MICO mode information indicating that the WTRU is in a MICO mode. At 1020, the MICO WTRU 102 may send a RRC Connection Request to the RAN 113. At 1030, the RAN 113 may send a RRC Connection Setup to the WTRU 102. At 1040, the MICO WTRU 102 may send a RRC Connection Setup Complete to the RAN 113 which may include an SR. At 1050, the RAN 113 may send the SR to the NW (e.g., the AMF 182*a*). At 1060, the AMF 182*a* may send an N2 message to the RAN 113. The N2 message may include MICO mode information that may indicate that the WTRU 102 is in the MICO mode. At 1070, the RAN 113 may store the MICO mode indication in a WTRU context. At 1080, the RAN 113 may send a RRC Connection Reconfiguration to the WTRU 102.

For example, the RAN 113 may be informed of the MICO mode of a WTRU 102 (e.g., via an indicator or other information) by the CN 115) via N2 signaling during the SR procedure. The RAN 113 may store the indication and/or information in its WTRU context and may refrain from triggering a state switch to the RRC_INACTIVE state for the WTRU 102.

In certain representative embodiments, the WTRU 102 in the MICO mode may include a MICO mode indication in the RRC Connection establishment request message, for example if the RRC Connection Request is triggered by a pending SR. If the RRC Connection Request is triggered by non-service-request signaling (e.g., by a periodic registration update, among others) the MICO mode may be changed after the registration procedure is over and/or completed. In some representative embodiments, such as for those triggered by a non-SR signaling, the WTRU 102 may not include the MICO mode indication in the RRC Connection Request.

Figure 11:
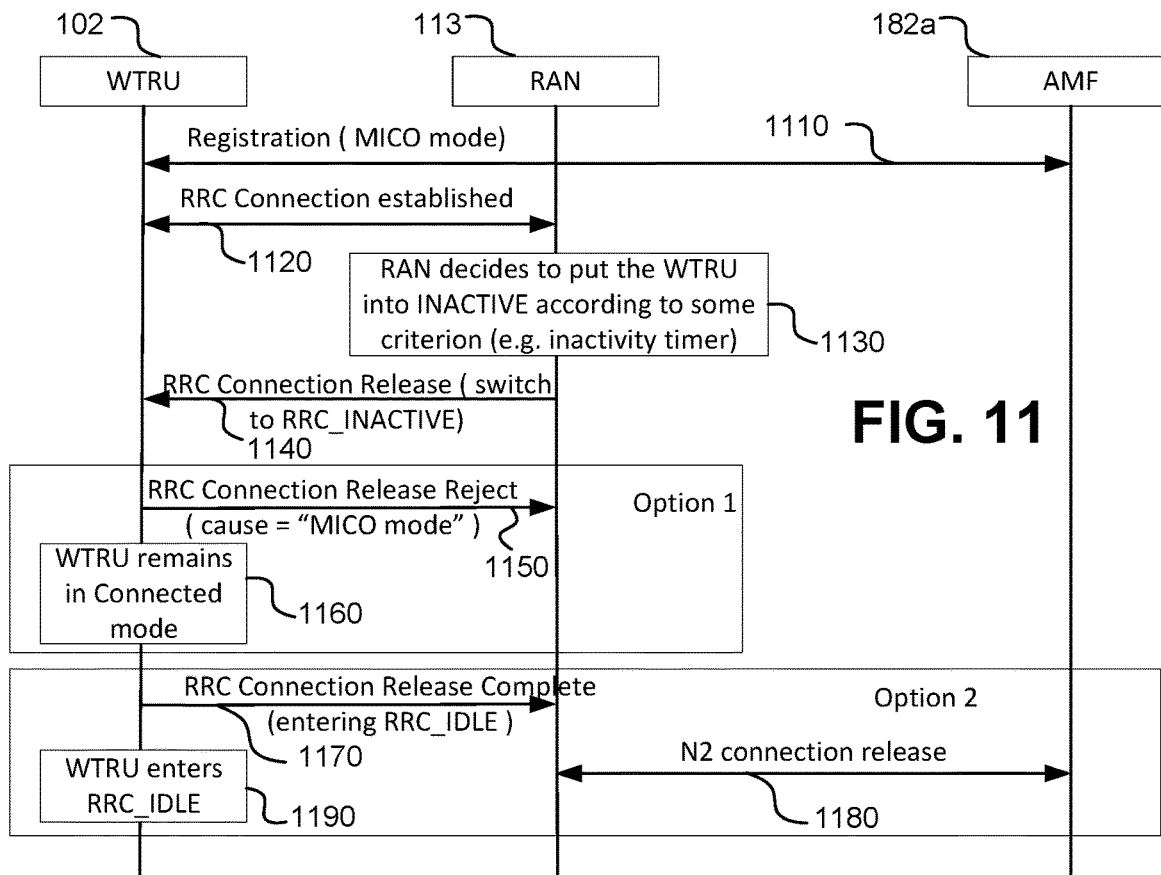
FIG. 11 is a diagram illustrating a representative procedure for a MICO WTRU to accept or reject RAN signaling.

FIG. 11 is a diagram illustrating a representative procedure for a MICO WTRU 102 to accept or reject RAN signaling (e.g., that would place the MICO WTRU 102 into an INACTIVE state).

Referring to FIG. 11, in the representative procedure 1100, at 1110, a registration is performed between the AMF 182a and the MICO WTRU 102 via the RAN 113. The registration may include MICO mode information indicating that the WTRU 102 is in a MICO mode. At 1120, an RRC connection may be established between the WTRU 102 and the RAN 113. At 1120, the RAN 113 may determine that the WTRU is to be placed into INACTIVE state (e.g., RRC_INACTIVE) according to some criterion (e.g., an inactivity timer). At 1140, the RAN 113 may send a RRC Connection Release to the WTRU 102 including information indicating a switch to RRC_INACTIVE state. In certain representative embodiments, at 1150 and 1160, the WTRU 102 may reject the Connection Release. In other representative embodiments, at 1170, 1180 and 1190, the WTRU 102 may accept the Connection Release.

In a first option, at 1150, the WTRU 102 may send a RRC Connection Release Reject to the RAN 113. The RRC Connection Release Reject may include a cause code indicating "MICO mode." At 1160, the WTRU 102 may remain in Connected mode.

In a second option, at 1170, the WTRU 102 may send a RRC Connection Release Complete to the RAN 113. The RRC Connection Release Complete may include information indicating that the WTRU is entering RRC_IDLE mode. At 1180, an N2 connection release is performed between the AMF 182a and the RAN 113. At 1190, the WTRU 102 may enter the RRC_IDLE mode.

In certain representative embodiments, the RAN 113 may not be aware of the MICO mode of the WTRU 102, and may initiate a Request (e.g., via RRC signaling, for example using a RRC Connection Release with an RRC_INACTIVE state switch instruction) to put and/or place the WTRU 102 into the RRC_INACTIVE mode. The WTRU 102, in the MICO mode, may reject the Request (for example with a cause of "MICO mode") and the WTRU 102 may stay in the RRC_CONNECTED mode. In various representative embodiments, the WTRU 102 may enter (e.g., directly enter) the RRC_IDLE mode upon or after the Request to enter the RRC_INACTIVE and may send a response message to the RAN 113 indicating that the WTRU 102 is going to enter the RRC_IDLE mode. Upon or after reception of the response message by the RAN 113, the RAN 113 may initiate an N2 connection release towards the CN 115.

The representative procedures described herein may apply to MICO WTRUs 102 that perform deregistration at the end of a communication.

Representative Procedures for Triggering a Registration Procedure

In certain representative embodiments, a "handshake" (e.g., a new handshake) may be realized between the WTRU 102 and the NW 113/115 during the SR procedure. The WTRU 102 may or is to indicate to the NW 113/115 that the WTRU 102 wants, in addition to or in lieu of the regular and/or legacy purpose of the SR message, to inform the NW 113/115 of certain configuration changes and/or parameters, for example by inserting a flag in the SR message. For example, a new information element may be defined to serve this purpose (e.g., to indicate or inform the NW 113/115 of configuration changes/parameters). On the NW side, in addition to processing the regular SR message, the NW 113/115 may respond back to the WTRU 102, using a Service Accept message, to finalize the negotiation/handshake. It is contemplated that these procedures/mechanisms described herein may be implemented as a new functionality, for example in 5G or may be realized by the WTRU 102 and the NW 113/115 informing each other of the support during the first registration (e.g., during the Attach or the first Registration).

If the NW 113/115 wants and/or is to update configuration parameters for the WTRU 102 (e.g. NW Slice Selection Assistance Information (NSSAI), an eDRX and/or a MICO periodic timer, among others), the NW 113/115 may use the SR procedure to trigger the WTRU 102 to perform a registration procedure. The NW 113/115 may include an explicit indication in the Service Accept or Reject message (e.g., with a cause code in the reject message) informing the WTRU 102 that certain configuration parameters are to be and/or need to be updated. The reception of the flag in the Service Accept or Reject message may cause the WTRU 102 to perform a registration procedure. In certain representative embodiments, the NW 113/115 (e.g., the AMF 182) may send the configuration parameters which are to be and/or which need to be updated in the Service Accept or Reject message. The WTRU 102 may perform the Registration procedure if the WTRU 102 receives new configuration parameters in the Service Accept or Reject message (e.g., a Service Accept or Reject NAS message).

FIG. 12 is a flowchart illustrating a representative method of facilitating a SR.

Referring to FIG. 12, the representative method 1200 may include, at block 1210, a WTRU 102 performing a first registration with a NE (e.g., an AMF 182a or another network device). The WTRU 102 may indicate to the NW 113/115 via the NE 182a that the WTRU 102 is operating in a MICO mode. At block 1220, the WTRU 102 may determine whether the WTRU 102 is registered in an "all PLMN" registration area. At block 1230, on condition that the WTRU 102 operating in the MICO mode is not registered in the "all PLMN" registration area, the WTRU 102 may determine whether the WTRU 102 is outside of a registration area associated with the first registration based on any of: (1) location related information associated with the WTRU 102 received after the first registration of the WTRU 102; (2) information from a Mobile Originated (MO) service initiated after the first registration of the WTRU 102 with the NE 113/115, and/or (3) a network provided flag. At block 1240, the WTRU 102 may send a SR. At block 1250, on condition that the WTRU 102 is determined to be outside the registration area, the WTRU 102 may perform a second registration or a registration update (e.g., with another NE (e.g., the AMF 182b) prior to the SR.

In certain representative embodiments, the WTRU 102 may obtain information indicating that the WTRU 102 is to initiate the second registration or the registration update for sending of the SR. For example, the WTRU 102 may perform the second registration or the registration update by sending a registration request in accordance with the obtained information.

In certain representative embodiments, the WTRU 102 may obtain the information via a preconfiguration and/or via network signaling (e.g., signaling via the network 113/115).

In certain representative embodiments, the WTRU 102 may determine that the WTRU 102 is registered to an "all PLMN" registration area.

In certain representative embodiments, the WTRU 102 may determine whether an "always register" indication is set, on condition that the WTRU 102 is registered to the "all PLMN" registration area.

In certain representative embodiments, the WTRU 102 may send a registration request to perform the second registration (e.g., an update) prior to the SR, on condition that an "always register" indication is set.

In certain representative embodiments, the WTRU 102 may obtain a Tracking Area (TA) identifier of a TA of the WTRU indicated in a broadcast signal. For example, the WTRU 102 may determine whether the WTRU 102 is outside of the registration area based on whether the obtained TA identifier (e.g., associated with the AMF 182a or 182b) matches a stored TA identifier associated with a NE (e.g., associated with the AMF 182a) last serving the WTRU 102 (e.g., such that the WTRU 102 is to perform the second registration or the registration update conditioned on the obtained TA identifier (e.g., associated with the AMF 182a or 182b) not matching the stored TA (e.g., associated with the AMF 182a).

In certain representative embodiments, the WTRU 102 may obtain an identifier associated with a registration area of the WTRU 102 indicated in a broadcast signal. For example, the WTRU 102 may determine whether the WTRU 102 is outside of the registration area based on whether the obtained identifier matches a stored identifier associated with a NE (e.g., the AMF 182a or other NE 180, 183-185) last serving the WTRU 102 such that the performing of the second registration or the registration update is conditioned on the obtained identifier not matching the stored identifier. In certain representative embodiments, the identifier may be one of: (1) a Tracking area identifier (e.g., associated with an AMF serving a registration area); (2) a Routing Area identifier or (2) an AMF identifier (e.g., identifying an AMF serving the registration area).

In certain representative embodiments, the WTRU 102 may send the SR without any second registration or registration update prior to sending the SR, on condition that the obtained TA identifier matches the stored TA identifier.

FIG. 13 is a flowchart illustrating another representative method of facilitating a SR registration.

Referring to FIG. 13, the representative method 1300 implemented by a WTRU 102 operating in a MICO mode and registered in a first registration area may include, at block 1310, a WTRU 102 determining whether the WTRU is outside (e.g., located outside) of the first registration area based on any of: (1) information from a latest Mobile Originated (MO) service of the WTRU 102 or (2) a network provided flag. At block 1320, the WTRU 102 may perform a registration update, on condition that the WTRU 102 is determined to be outside the first registration area. At block 1330, the WTRU 102 may send an SR after the registration update.

FIG. 14 is a flowchart illustrating a further representative method of facilitating a SR.

Referring to FIG. 14, the representative method 1400 may include, at block 1410, a WTRU 102 performing a first registration with a NE (e.g., an AMF 182a). The WTRU 102 may indicate to the NW 113/115 via the NE (e.g., the AMF 182a) that the WTRU 102 is operating in a MICO mode. At block 1420, the WTRU 102 may determine whether the WTRU is registered in an "all PLMN" registration area. At block 1430, the WTRU 102 may selectively perform, prior to the sending of a SR, a second registration or a registration update based on the WTRU 102 not being registered in an "all PLMN" registration area and the WTRU 102 being outside of a registration area associated with the first registration. At block 1440, the WTRU 102 may send the SR.

FIG. 15 is a flowchart illustrating an additional representative method of facilitating a SR.

Referring to FIG. 15, the representative method 1500 may include, at block 1510, a WTRU 102 sending a SR that includes WTRU-specific information. The WTRU-specific information may include: (1) an indication that the WTRU 102 is operating in a MICO mode; and/or (2) a Temporary User Identifier (TUID) of the WTRU 102. At block 1520, the WTRU 102 may receive a Connection Reconfiguration message and a WTRU Configuration message including a new TUID, different from the TUID in the SR.

FIG. 16 is a flowchart illustrating yet another representative method of facilitating a SR.

Referring to FIG. 16, the representative method 1600 may include, at block 1610, a WTRU 102 receiving a broadcast signal indicating a Network Entity (NE) identifier associated with a NE (e.g., the AMF 182a or 182b) currently serving the WTRU 102. At block 1620, the WTRU 102 (e.g., AS layer, a L1 layer, a L2 layer, a MAC layer, a physical layer, or another lower layer, among others) may receive a connection request from a higher layer (e.g., a NAS layer, another higher layer, among others). At block 1630, the WTRU 102 may determine, by a second layer (e.g., an AS layer, a L1 layer, an L2 layer, a MAC layer, a physical layer, or the other lower layer, among others), whether the WTRU 102 is operating in a MICO mode. At block 1640, the WTRU 102 may determine whether the received NE identifier matches a stored NE identifier associated with a NE (e.g., the AMF 182a) last serving the WTRU 102, on condition that the WTRU 102 is operating in the MICO mode. At block 1650, the WTRU 102 may send a SR including WTRU-specific information, on condition that the received NE identifier (e.g., the AMF 182a or 182b) matches the stored NE identifier (e.g., the AMF 182a).

In certain representative embodiments, the WTRU 102 may send a new registration or a registration update prior to sending a SR, on condition that the received NE identifier (e.g., the AMF 182a or 182b) does not match the stored NE identifier (e.g., the AMF 182a).

FIG. 17 is a flowchart illustrating yet a further representative method of facilitating a SR.

Referring to FIG. 17, the representative method 1700 may include, at block 1710, a WTRU 102 obtaining information indicating that the WTRU is to initiate registration prior to sending a SR. At block 1720, the WTRU 102 may send a registration request in accordance with the obtained information. At block 1730, the WTRU 102 may send the SR after registering with a NE (e.g., an AMF 182b).

In certain representative embodiments, the WTRU 102 may obtain the information via a preconfiguration or via network signaling.

In certain representative embodiments, the WTRU 102 may determine whether the WTRU 102 is operating in a MICO mode and may send the registration request prior to the SR on condition that the WTRU 102 is operating in the MICO mode.

In certain representative embodiments, the WTRU 102 may determine whether the WTRU 102 is registered to an "all PLMN" registration area and may send the registration request prior to the SR on condition that the WTRU 102 is registered to an "all PLMN" registration area.

In certain representative embodiments, the WTRU 102 may receive a broadcast signal indicating a Tracking Area (TA) identifier of a TA of the WTRU 102, may receive a connection request from a higher layer, and may determine, by a second layer, whether the WTRU 102 is operating in the MICO mode.

In certain representative embodiments, the WTRU 102 may determine at least whether the indicated TA identifier matches a stored TA identifier associated with a NE (e.g., the AMF 182a) last serving the WTRU 102, on condition that the WTRU 102 is operating in MICO mode, and may send the SR, on condition that the indicated TA identifier matches the stored TA identifier.

In certain representative embodiments, the WTRU 102 may send a new registration or a registration update prior to sending the SR, on condition that the indicated TA identifier does not match the stored TA identifier.

FIG. 18 is a flowchart illustrating yet an additional representative method of accepting or rejecting a connection release.

Referring to FIG. 18, the representative method 1800 implemented by a WTRU 102 in a MICO mode may include, at block 1810, the WTRU 102 receiving, from a NE (e.g., a gNB 180) of a RAN 113, a Connection Release. At block 1820, the WTRU 102 may determine whether to accept the Connection Release. At block 1830, on condition that the WTRU 102 accepts the Connection Release, the WTRU may: (1) send a Connection Release Complete, and (2) enter into an idle mode. At block 1840, on condition that the WTRU 102 does not accept the Connection Release, the WTRU 102 may: (1) send a Connection Release Reject with a cause code indicating that the WTRU 102 is operating in the MICO mode, and (2) remain in a connected mode.

FIG. 19 is a flowchart illustrating a representative method implemented to facilitate a registration.

Referring to FIG. 19, the representative method 1900 implemented by a WTRU 102 may include, at block 1910, the WTRU 102 sending to a NE (e.g., an AMF 182, or other NE such as a gNB 180, or CN entity 183-185) a first message. At block 1920, the WTRU 102 may obtain information indicating that the WTRU 102 is to initiate registration. At block 1930, the WTRU may send a registration request in accordance with the obtained information. For example, the obtained information may be a cause code or an indication included in a second message from the NE 180 and 182-185. In certain representative embodiments, the first message may be a service request and/or the second message may be a service accept or a service reject message. In various representative embodiments, the WTRU may perform a registration update and may update configuration parameters based on the registration update.

FIG. 20 is a flowchart illustrating a representative method implemented by a NW to facilitate a SR.

Referring to FIG. 20, the representative method 2000 implemented by a Network Entity (NE) (e.g., an AMF 182, or other NE such as a gNB 180, or CN entity 183-185) may include, at block 2010, the NE 182 sending information indicating that the WTRU 102 is to initiate registration prior to sending an SR. At block 2020, the NE 182 may receive a registration request in accordance with the obtained information. At block 2030, the NE 113/115 may receive the SR after the WTRU 102 is registered.

FIG. 20 is a flowchart illustrating another representative method implemented by a NW when a WTRU is in MICO mode.

Referring to FIG. 21, the representative method 2100 implemented by a NE (e.g., an AMF 182, or other NE 180, 183-185) of the NW 113/115 may include, at block 2110, the NE 180, 182-185 determining whether the WTRU 102 is operating in a MICO mode. At block 2120, on condition that the WTRU 102 is operating in the MICO mode, the NE 180, 182-185 of the NW 113/115 may: (1) set an inactivity timer for a period which is longer than a period for a WTRU 102 not in the MICO mode; (2) prevent a connection release of the WTRU 102 for inactivity of the WTRU 102; and/or (3) negotiate with the WTRU 102 so that the WTRU 102 is configured to autonomously release the connection with the NE 180, 182-185 of the NW 113/115.

FIG. 22 is a flowchart illustrating a further representative method implemented by a NW to facilitate a connection request.

Referring to FIG. 22, the representative method 2200 implemented by a NE (e.g., an AMF 182b, or other NE 180, 183-185) of the NW 113/115 may include, at block 2210, the NE 182b receiving a message requesting a connection of a WTRU 102 including WTRU-specific information. At block 2220, the NE 182b may determine from the WTRU-specific information, another NE (e.g., the AMF 182a) that last served the WTRU 102. At block 2230, the NE 182b may send to the other NE (e.g., the AMF 182a), an information request for information to connect the WTRU 102 with the NE 182b.

In certain representative embodiments, the NE 182b may receive, from the other NE 182a, the requested information to connect the WTRU 102 and may authenticate and connect the WTRU 102 based on the information received from the other NE 182a.

In certain representative embodiments, the WTRU-specific information may include any of: (1) an indication that the WTRU 102 is operating in a MICO mode; and/or (2) a Temporary User Identifier (TUID) of the WTRU 102.

FIG. 23 is a flowchart illustrating an additional representative method implemented by a NW to facilitate a SR.

Referring to FIG. 23, the representative method 2300 implemented by a NE (e.g., an AMF 182, or other NE 180, 183-185) of the NW 113/115 may include, at block 2310, the NE 182 receiving a registration request to register a WTRU 102 including an indication that the WTRU is operating in a MICO mode. At block 2320 the NE 182 may receive from the WTRU 102 (e.g., via a RAN 113) after registration, a SR including a preference for WTRU-initiated connection release of the WTRU 102. At block 2330, the NE 182 may receive from one of: (1) the WTRU 102 (e.g., via a RAN entity 180 of RAN 113) a NAS release request) or (2) the RAN 113 (e.g., the gNB 180) a N2 connection release (e.g., in accordance with a RRC Connection release request from the WTRU 102). For example, for one option, the WTRU 102 may send an RRC Connection release request to the RAN 113 and the RAN 113 may perform a N2 connection release with the AMF 182 thereafter. At block 2340, the NE 182 may release a connection toward the WTRU 102.

In certain representative embodiments, the NE 182 may determine whether to accept the preference and may send to the RAN entity (e.g., the gNB 180) of the RAN 113 serving the WTRU 102 that the preference is accepted.

In certain representative embodiments, the NE 182 may check any of: (1) a WTRU profile; or (2) a WTRU mobility pattern.

Figure 24:
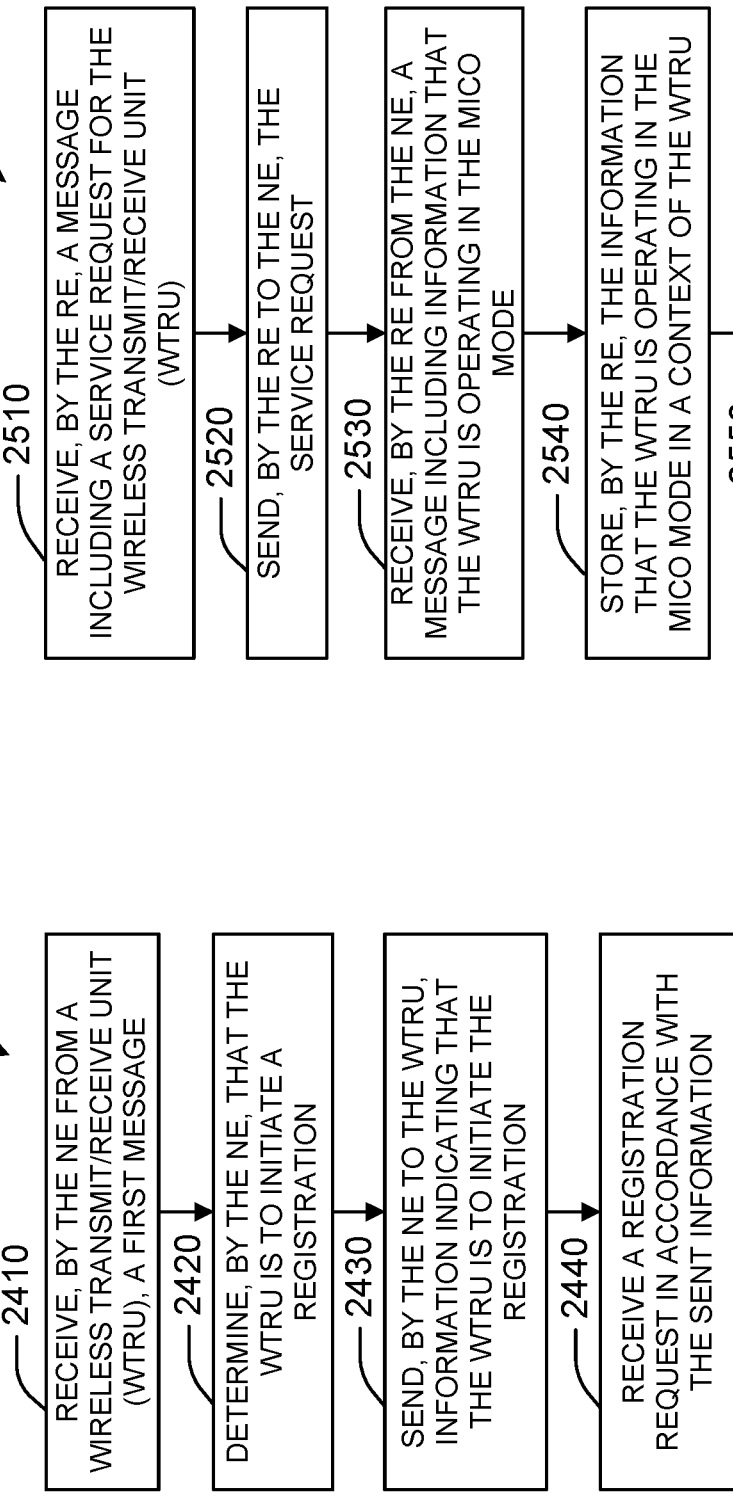
FIG. 24 is a flowchart illustrating a representative method implemented by a NW to facilitate a registration.

FIG. 24 is a flowchart illustrating a representative method implemented by a NW to facilitate a registration.

Referring to FIG. 24, the representative method 2400 implemented by a NE (e.g., an AMF 182, or other NE such as a gNB 180, or CN entity 183-185) may include, at block 2410, the NE 180, 182-185 receiving from the WTRU 102 a first message. At block 2420, the NE 180, 182-185 may determine that the WTRU is to initiate a registration. At block 2430, the NE 180, 182-185 may send to the WTRU information indicating that the WTRU is to initiate the registration. At block 2440, the WTRU may receive a registration request in accordance with the sent information. For example, the sent information may be a cause code or an indication included in a second message from the NE 180 and 182-185. In certain representative embodiments, the first message may be a service request and/or the second message may be a service accept or a service reject message.

Figure 25:
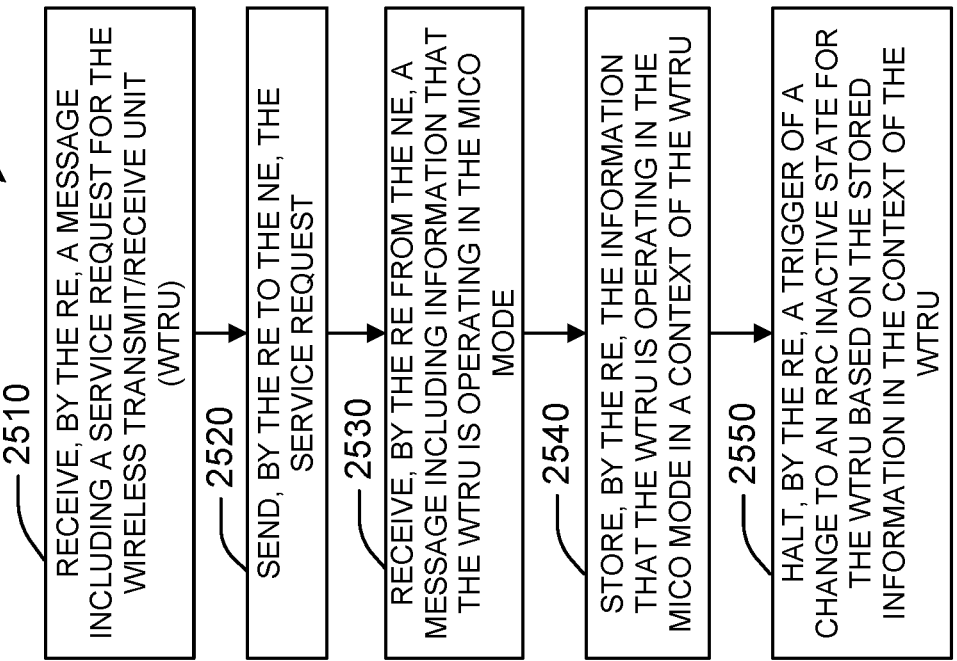
FIG. 25 is a flowchart illustrating a representative method implemented by a RAN entity to facilitate a SR.

FIG. 25 is a flowchart illustrating a representative method implemented by a RAN entity to facilitate a SR.

Referring to FIG. 25, the representative method 2500 implemented by a RAN entity (RE) (e.g., a gNB 180) of the RAN 113 may include, at block 2510, the RAN entity 180 receiving a message including an SR for the WTRU 102. A registration of the WTRU 102 with a Network Entity (NE) (e.g., AMF 182 may indicate that the WTRU 102 is operating in a MICO mode. At block 2520, the RE 180 may send to the NE 182 the SR. At block 2530, the RE 180 may receive from the NE 182, a message including information that the WTRU 102 is operating in the MICO mode. At block 2540, the RE 180 may store the information that the WTRU 102 is operating in the MICO mode in a context of the WTRU 102. At block 2550, the RE 180 may halt a trigger of a change to an RRC inactive state for the WTRU 102 based on the stored information in the context of the WTRU 102.

Although only two AMFs 182*a* and 182*b* are shown, any number of AMF may be implemented in a CN 115.

Various NEs and REs are illustrated herein. These NEs may include one or more processors, one or more transmitters and one or more receivers and one or more memories operatively communicating, and configured to execute the method of any of the embodiments disclosed herein.

WTRUs are illustrated herein. The WTRUs may include one or more processors, one or more transmitters and one or more receivers and one or more memories operatively communicating, and configured to execute the method of any of the embodiments disclosed herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, a UE, a terminal, a base station, an RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a base station, the method comprising:
   receiving, from a Wireless Transmit/Receive Unit (WTRU), a first registration request message which includes information indicating a preference for the WTRU to operate in a Mobile Initiated Communication Only (MICO) mode;
   sending, to the WTRU, a registration accept message which includes information indicating the MICO mode is accepted;
   after sending the registration accept message, receiving, from the WTRU, a first service request message;
   sending, to the WTRU, a service reject message including information indicating that the WTRU is to perform registration; and
   after sending the service reject message, receiving, from the WTRU, a second registration request message.

2. The method of claim 1, wherein the information indicating that the WTRU is to perform registration is a cause code included in the service reject message.

3. The method of claim 1, wherein the information indicating that the WTRU is to perform registration is an explicit indication included in the service reject message.

4. The method of claim 1, further comprising:
   after receiving the second registration request message, sending, to the WTRU, another registration accept message including one or more configuration parameters.

5. The method of claim 4, wherein the one or more configuration parameters include any of network slice selection assistance information (NSSAI), discontinuous reception (DRX) parameters, and/or a MICO periodic timer parameter.

6. The method of claim 1, wherein the registration accept message includes one or more configuration parameters including any of network slice selection assistance information (NSSAI), discontinuous reception (DRX) parameters, and/or a MICO periodic timer parameter.

7. The method of claim 1, wherein the first registration request message is an initial registration request message.

8. The method of claim 1, wherein the second registration request message is a registration update request message.

9. The method of claim 1, further comprising:
after receiving the second registration request message, sending, to the WTRU, another registration accept message; and
after sending the other registration accept message, sending mobile terminated data and/or signaling to the WTRU.

10. The method of claim 1, further comprising:
after receiving the second registration request message, sending, to the WTRU, another registration accept message; and
after sending the other registration accept message, receiving mobile originated data and/or signaling from the WTRU.

11. A base station comprising:
a processor and a transceiver configured to:
receive, from a Wireless Transmit/Receive Unit (WTRU), a first registration request message which includes information indicating a preference for the WTRU to operate in a Mobile Initiated Communication Only (MICO) mode,
send, to the WTRU, a registration accept message which includes information indicating the MICO mode is accepted,
after sending the registration accept message, receive, from the WTRU, a first service request message,
send, to the WTRU, a service reject message including information indicating that the WTRU is to perform registration, and
after sending the service reject message, receive, from the WTRU, a second registration request message.

12. The base station of claim 11, wherein the information indicating that the WTRU is to perform registration is a cause code included in the service reject message.

13. The base station of claim 11, wherein the information indicating that the WTRU is to perform registration is an explicit indication included in the service reject message.

14. The base station of claim 11, wherein the processor and the transceiver are configured to:
after receiving the second registration request message, send, to the WTRU, another registration accept message including one or more configuration parameters.

15. The base station of claim 14, wherein the one or more configuration parameters include any of network slice selection assistance information (NSSAI), discontinuous reception (DRX) parameters, and/or a MICO periodic timer parameter.

16. The base station of claim 11, wherein the registration accept message includes one or more configuration parameters including any of network slice selection assistance information (NSSAI), discontinuous reception (DRX) parameters, and/or a MICO periodic timer parameter.

17. The base station of claim 11, wherein the first registration request message is an initial registration request message.

18. The base station of claim 11, wherein the second registration request message is a registration update request message.

19. The base station of claim 11, wherein the processor and the transceiver are configured to:
after receiving the second registration request message, send, to the WTRU, another registration accept message, and
after sending the other registration accept message, send mobile terminated data and/or signaling to the WTRU.

20. The base station of claim 11, wherein the processor and the transceiver are configured to:
after receiving the second registration request message, send, to the WTRU, another registration accept message, and
after sending the other registration accept message, receive mobile originated data and/or signaling from the WTRU.

* * * * *